(12) United States Patent
Huynh

(10) Patent No.: US 10,681,014 B2
(45) Date of Patent: Jun. 9, 2020

(54) REGULATE CONTENT PLAYLISTS

(71) Applicant: Prolifiq Software Inc., Beaverton, OR (US)

(72) Inventor: Hemingway Huynh, Salem, OR (US)

(73) Assignee: PROLIFIQ SOFTWARE INC., Beaverton, OR (US)

( * ) Notice: Subject to any disclaimer, the term of this patent is extended or adjusted under 35 U.S.C. 154(b) by 222 days.

(21) Appl. No.: 15/628,339

(22) Filed: Jun. 20, 2017

(65) Prior Publication Data
US 2018/0367508 A1 Dec. 20, 2018

(51) Int. Cl.
| | |
|---|---|
| *H04L 29/06* | (2006.01) |
| *G06F 21/12* | (2013.01) |
| *G06F 21/62* | (2013.01) |
| *G06F 21/10* | (2013.01) |

(52) U.S. Cl.
CPC .......... *H04L 63/0428* (2013.01); *G06F 21/10* (2013.01); *G06F 21/128* (2013.01); *G06F 21/6218* (2013.01)

(58) Field of Classification Search
CPC . H04L 63/0428; G06F 21/128; G06F 21/6218
See application file for complete search history.

(56) References Cited

U.S. PATENT DOCUMENTS

| | | | | |
|---|---|---|---|---|
| 9,396,279 | B1* | 7/2016 | O'Donnell | G06F 16/986 |
| 2004/0179689 | A1* | 9/2004 | Maggenti | H04L 63/0428 380/270 |
| 2012/0260155 | A1* | 10/2012 | Krieger | G06Q 10/10 715/229 |
| 2014/0249844 | A1* | 9/2014 | Liberty | G06F 19/3418 705/2 |
| 2017/0205965 | A1* | 7/2017 | Goel | G06Q 10/103 |

* cited by examiner

*Primary Examiner* — Noura Zoubair
(74) *Attorney, Agent, or Firm* — Schwabe Williamson & Wyatt, P.C.

(57) ABSTRACT

Methods, systems, and storage media are described for generating, regulating, and distributing regulated content playlists. A cloud computing service/system may facilitate a user in creating a regulated content playlist, verify that the regulated content playlist complies with various standards promulgated by regulatory agencies and/or governing bodies, and facilitate and control distribution of the regulated content playlist to various recipients that are permitted to access the regulated content playlist. Other embodiments may be described and/or claimed.

19 Claims, 19 Drawing Sheets

REGULATE CONTENT PLAYLISTS

FIELD

The present disclosure relates to the technical field of data processing, and in particular, to apparatuses, methods and storage media for generating, regulating, and distributing regulated content playlists.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Professionals, such as physicians, service providers, and other information workers are frequently provided with information that is relevant to their practice from content providers (for example, pharmaceutical manufacturers or resellers, medical equipment/device manufacturers or resellers, and the like). The content may be used by intermediary parties, such as representatives of the content providers or of other services, to discuss services, drugs, equipment, etc. with the professionals. The information conveyed by the content and/or the type of content that may be distributed to the professionals may be regulated by regulatory bodies or administrative agencies (for example, the Food and Drug Administration (FDA)). However, content providers and/or the intermediary parties may have difficulties in navigating regulatory frameworks when producing and/or distributing the content to the professionals.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
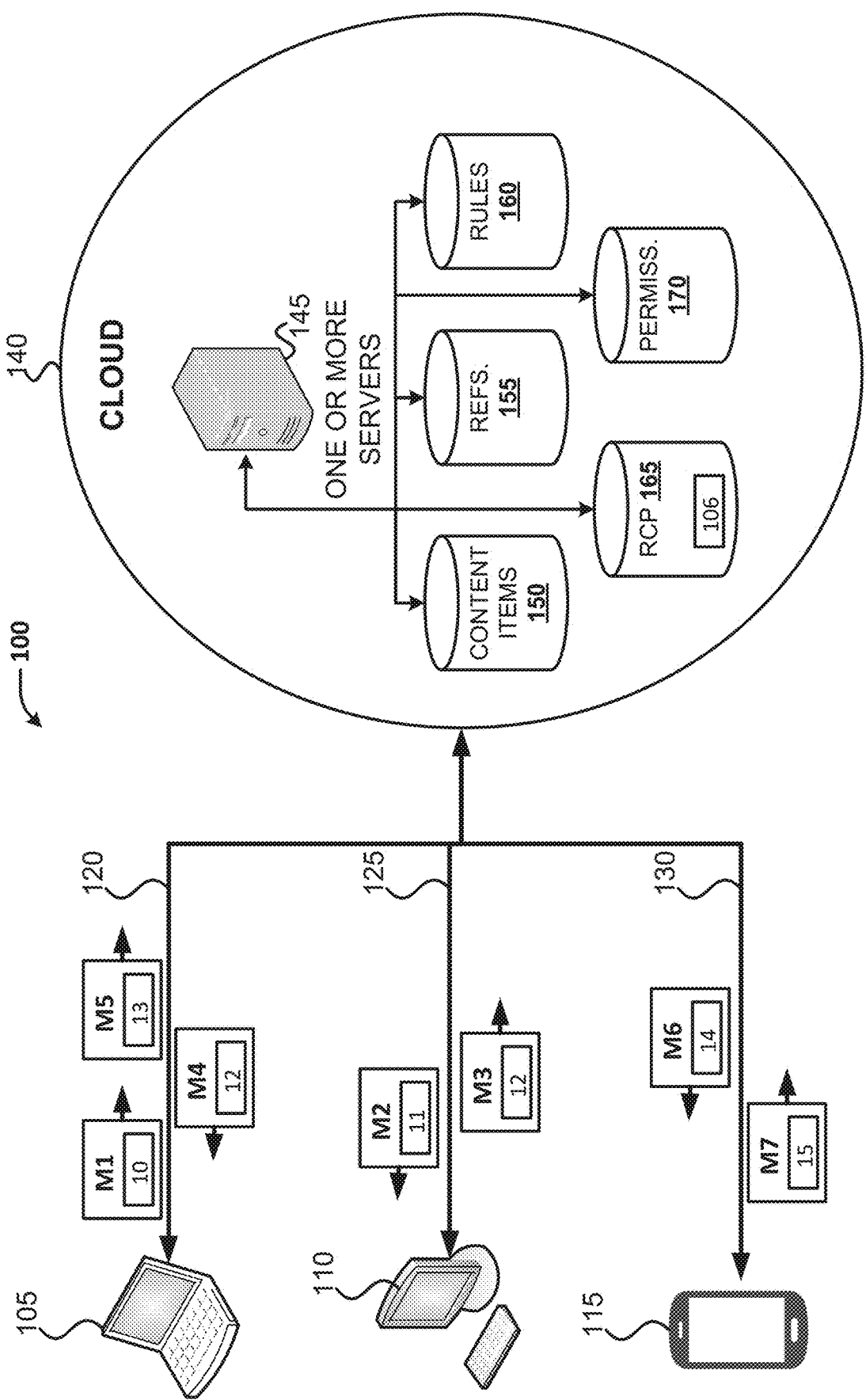
FIG. 1 illustrates an arrangement suitable for practicing various embodiments of the present disclosure.

Embodiments described herein are directed to methods, apparatuses, systems, and computer-readable media for generating, regulating, and distributing regulated content playlists. In various embodiments, a cloud computing service ("cloud") or a customer may be configured to facilitate a user, such as a representative, in creating a regulated content playlist, verify that the regulated content playlist complies with various standards promulgated by regulatory agencies and/or governing bodies, and facilitate and control distribution of the regulated content playlist to various recipients.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Where the disclosure recites "a" or "a first" element or the equivalent thereof, such disclosure includes one or more such elements, neither requiring nor excluding two or more such elements. Further, ordinal indicators (for example, first, second or third) for identified elements are used to distinguish between the elements, and do not indicate or imply a required or limited number of such elements, nor do they indicate a particular position or order of such elements unless otherwise specifically stated.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Where the disclosure recites "a" or "a first" element or the equivalent thereof, such disclosure includes one or more such elements, neither requiring nor excluding two or more such elements. Further, ordinal indicators (for example, first, second or third) for identified elements are used to distinguish between the elements, and do not indicate or imply a required or limited number of such elements, nor do they indicate a particular position or order of such elements unless otherwise specifically stated As used herein, the terms "circuitry" may refer to, be part of, or include an Application Specific Integrated Circuit ("ASIC"); Field Programmable Gate Arrays (FPGAs); electronic circuits; one or more processors (shared, dedicated, or group) and/or memory (shared, dedicated, or group) that execute one or more software, middleware, or firmware programs; a combinational logic circuit; and/or other suitable components that provide the described functionality. Additionally, the terms "logic" and/or "module" may include logic (including operating systems or application instructions, data, etc.) at least partially operable in circuitry. The circuitry may implement the module/logic to cause the module/logic to perform operations described herein.

As used herein, the term "memory" may represent one or more hardware devices for storing data, including random access memory (RAM), magnetic RAM, core memory, read only memory (ROM), magnetic disk storage mediums, optical storage mediums, flash memory devices, solid state drives, and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used herein, the terms "computer system" may be considered synonymous to, and may hereafter be occasionally referred to, as a computer device, computing device, computing platform, client device, client, mobile, mobile device, user equipment (UE), terminal, receiver, server, etc., and may describe any physical hardware device capable of sequentially and automatically carrying out a sequence of arithmetic or logical operations; equipped to record/store data on a machine readable medium; and transmit and receive data from one or more other devices in a communications network. The term "computer system" may include any type of electronic devices, such as a cellular phone or smart phone, tablet personal computer, wearable computing device, an autonomous sensor, laptop computer, desktop personal computer, a video game console, a digital media player, a handheld messaging device, a personal data assistant, an electronic book reader, an augmented reality device, server computer device(s) (for example, stand-alone, rack-mounted, blade, etc.), and/or any other like electronic device. Additionally, the term "computer system" and/or "system" may refer to various components of a computer that are communicatively coupled with one another. Furthermore, the term "computer system" and/or "system" may refer to multiple computer devices that are communicatively coupled with one another and configured to share computing and/or networking resources.

As used herein, the term "network element", may be considered synonymous to and/or referred to as a networked computer, networking hardware, network equipment, access point, router, switch, hub, bridge, gateway, and/or other like device. The term "network element" may describe a physical hardware device of a wired or wireless communication network that is configured to host a client device and the like. Furthermore, the term "network element" may describe equipment that provides radio baseband functions for data and/or voice connectivity between a network element and/or one or more users.

In the following description particular examples are provided, for the sake of example, with reference to particular roles or professions. For example, embodiments are described herein with reference to "providers", "representatives", "physicians", "reviewers", "regulators", "recipients", etc. Various embodiments may be practiced to facilitate communication between various persons and/or roles, and that the embodiments and techniques described herein should not be read to be limited by any particular roles used for exemplary description. Additionally, while particular subject matter is offered as examples of types of information that may be discussed during a contact, such as, for example, "pharmaceuticals", "drugs", "medical devices" or "devices", no particular limitation on the type of contacts should be implied. Further, "contacts" as used herein, may refer to various types of communication between different parties, including, but not limited to, audio, video, text, email, and in-person communications.

Referring now to the figures, FIG. 1 shows an arrangement 100 suitable for practicing various embodiments of the present disclosure. As shown in FIG. 1, arrangement 100 may include representative computer device 105, reviewer computer device 110, recipient computer device 115, and cloud computing service ("cloud") 145. The representative computer device 105, the reviewer computer device 110, and the recipient computer device 115 may be collectively referred to as "client devices" and the like. Cloud 140 may include one or more servers 145 and various databases (DBs) 150-170 including the content items DB 150, references (refs.) DB 155, rules DB 160, regulated content playlist (RCP) DB 165, and permissions DB 170.

The cloud computing service 140 (also referred to as "cloud 140" and the like) may be a system of computer devices (for example, one or more servers 145, storage devices including the DBs 150-170, etc. within or associated with a data center or data warehouse) that provides access to a pool of computing resources. A "computing resource" may refer to a physical or virtual component within a computing environment and/or within a particular computer device, such as memory space, processor time, electrical power, input/output operations, ports or network sockets, and the like. The one or more servers 145 in the cloud 140 may be individual computer devices, where each of the servers 145 include one or more processors, one or more memory devices, input/output (I/O) interfaces, communications interfaces, and/or other like components. The one or more servers 145 may be connected with one another via a Local Area Network (LAN), fast LAN, message passing interface (MPI) implementations, and/or any other suitable networking technology. Various combinations of the one or more servers 145 may implement different cloud elements or nodes, such as a cloud manager, a cluster manager, master node, a plurality of secondary (slave) nodes, and the like. The one or more servers 145 may implement additional or alternative nodes/elements in other embodiments.

In some implementations, some of the servers 145 (for example, servers 145 that act as secondary nodes) may implement application server functionality, such as obtaining various messages from the client devices; processing data contained in those messages; routing data to other nodes in the cloud 140 for further processing, storage, retrieval, etc.; generating and communicating messages including data items, content items, program code, renderable webpages and/or documents (for example, including the various interfaces discussed herein), and/or other information to/from client devices; and/or other like application server functions. In some implementations, cloud 140 may be a customer relationship management (CRM) system where some of the servers 145 act as nodes that implement and execute CRM applications for the storage and retrieval of information in/from various database objects. In this way, various combinations of the one or more servers 145 may implement different cloud elements/nodes configured to perform the embodiments discussed herein.

In various embodiments, the cloud 140 may be configured to provide one or more interfaces to the client devices. In embodiments, the interfaces may be graphical user interfaces (GUIs) comprising graphical control elements (GCEs) that may allow the client devices to perform various functions and/or to request or instruct the cloud 140 to perform various functions. For example, the cloud 150 may provide interfaces that allow a representative computer device 105 to generate a proposed regulated content playlist (PRCP), populate the PRCP with a set of content items, submit the PRCP for verification or compliance with regulatory requirements, and distribute approved regulated content playlists (ARCPs) to identified recipient computer devices 115. In another example, the cloud 140 may provide interfaces that allow a reviewer computer device 110 to access a PRCP, revise or comment on individual content items of the PRCP, and/or approve the PRCP for conversion into an ARCP. In another example, the cloud 140 may provide interfaces that allow a recipient computer device 115 to obtain an invitation to access an ARCP, access approved content items of the ARCP, and comment on the ARCP and/or individual content items of the ARCP.

The cloud 140 may also provide various other interfaces as discussed herein. The interfaces may be developed using website development tools and/or programming languages (for example, HTML, Cascading Stylesheets (CSS), JavaScript, Jscript, Ruby, Python, etc.) and/or using platform-specific development tools (for example, Android® Studio™ integrated development environment (IDE), Microsoft® Visual Studio® IDE, Apple® iOS® software development kit (SDK), etc.). The term "platform-specific" may refer to the platform implemented by the client devices and/or the platform implemented by the cloud 140. Example interfaces are shown and described with regard to FIGS. 5-17.

In various embodiments, the cloud 140 may be configured to establish and maintain establish end-to-end encrypted tunnels (EETs) 120, 125, and 130 between the cloud 140 and various client devices. The EETs may also be referred to as "secure channels", "encrypted channels", and the like. The EETs may be established using any suitable a tunneling protocol that uses an encryption algorithm to (re)package data traffic for communication between computer devices. Examples of such tunneling protocols may include Internet Protocol Security (IPSec), Secure Socket Layer (SSL), Transport Layer Security (TLS), Pretty Good Privacy (PGP) and/or OpenPGP, Secure Shell (SSH), Kerberos, and the like.

The DBs 150-170 may each comprise one or more data storage devices that act as a repository for persistently storing and managing collections of data according to a predefined database structure. The data storage devices may include one or more primary storage devices, secondary storage devices, tertiary storage devices, non-linear storage devices, and/or other like data storage devices. In some implementations, at least some of the servers 145 may implement a suitable database management system (DMS) to execute storage and retrieval of information against various database object(s). The DMS may include a relational database management system (RDBMS), an object database management system (ODBMS), and/or the equivalent. The DBs 150-170 can be implemented as part of a single database, a distributed database, a collection of distributed databases, a database with redundant online or offline backups or other redundancies, etc., and can include a distributed database or storage network. The server(s) 145 implementing the DMS may utilize any suitable query language to store and retrieve information in/from the DBs 150-170. Suitable implementations for the database systems and storage devices are known or commercially available, and are readily implemented by persons having ordinary skill in the art.

The content items DB 150 may store various content items that may be distributed to various recipient devices 115 in one or more RCPs. The content items may include any information to be conveyed to a particular audience or end-user, and may include or convey information pertaining to specific subjects or topics. The content items may be different content types (for example, text, image, audio, video, etc.), and/or may have different formats (for example, text files including Microsoft® Word® documents, Portable Document Format (PDF) documents, HTML documents; audio files such as MPEG-4 audio files and WebM audio and/or video files; etc.). The particular information conveyed by the content items may be regulated by a governmental agency, trade association or standards body, and/or other entity. The content items DB 150 may include content items that have already been verified/approved as complying with regulatory requirements for distribution, and which may have been supplied to the cloud 140 by other users and/or publishing entities. In some embodiments, the content items DB 150 may store content items that are pending approval for distribution by one or more reviewer devices 110.

The refs. DB 155 may store reference items to be associated with the RCP and/or individual content items of an RCP. The reference items may be content that can be referred to for information regarding a particular scenario or topic. For example, the reference items may include journal articles, publications, literature produced/published by pharmaceutical manufacturers and/or medical device manufacturers, video content, and/or other like media. Such information may be obtained using processes described by U.S. application Ser. No. 13/032,461 titled "Tracking Digital Content Objects," U.S. application Ser. No. 13/841,982 titled "System for Multi-Point Publication Syndication," U.S. application Ser. No. 14/511,140 titled "Selective Sharing of Electronic Information", Int'l App. No. PCT/US2016/049138 titled "Contact Planning System", and/or the like.

The rules DB 160 may store any set of constraints and/or standards for conveying information for particular content items, tags, topics, etc. The rules may be generated based on statutes, regulations, standards, etc. promulgated by a governmental agency or regulatory body, and/or the rules may be generated based on historically disallowed words, content items, or combination or words/content items (for example, words that have been previously rejected by a governmental agency or regulatory body, or by a reviewer device 110). In embodiments, the rules stored in the rules DB 160 may be used to validate content items of an RCP prior to distribution to reviewer devices and/or recipient devices.

The RCP DB 165 may store various RCP entities, such as RCP entity 106, and associated information. An RCP entity 106 may be database object or record that stores various values, statistics, metadata, etc. related to a particular RCP. As used herein, a "database object" may refer to any representation of information in a database that is in the form of an object or tuple, and may include variables, data structures, functions, methods, classes, database records, database fields, database entities, associations or relations between data and database entities, and the like. The RCP entity 106 may comprise data elements or fields that store individual data items. For example, a field may include a links or identifier (for example, a content ID) for a content item to be included in the RCP, metadata related to the RCP, user data associated with the representative device 105, and/or other like information. The metadata of the RCP may include any information about the RCP, such as a name and/or unique ID of the RCP, a status of the RCP (for example, proposed, approved, rejected, etc.), status of individual content items in the RCP (for example, under review, approved, rejected, etc.), creation date of the RCP, edit/revision dates and/or times, and other like RCP parameters. The user data may include user IDs of users that are permitted to edit/review the RCP, employer ID or other employer-related information of the users that are permitted to edit/review the RCP, client device type and/or parameters, and/or other like information.

The permissions DB 170 may store access permissions. In embodiments, access to a piece of content may be controlled based on these access permissions. Users of the client devices may differ in their respective capacities, functions, roles, etc., and the types of RCPs and/or content items that a user of a client device may be determined by the access permissions stored in the permissions DB 170. For example, permissions DB 170 may store data access permissions allotted to a provider and/or a recipient client device 115, where the access permissions may be allocated to the provider based on capacities, functions, roles, etc., of the provider. The access permissions may be used to grant (or not grant) access to an RCP or individual content items of an RCP. In some embodiments, a hierarchical model may be used where users at one permission level may access certain RCPs and/or content items accessible by lower permission level users, but may not have access to certain RCPs and/or content items accessible by higher permission level users. In some embodiments, a role model may be used where users at defined as being part of a particular role may access certain RCPs and/or content items accessible users that are associated with the same or similar roles, but may not have access to certain RCPs and/or content items accessible by users having other roles regardless of an authority level associated with such users.

The client devices may include physical hardware devices capable of sequentially and automatically carrying out a sequence of arithmetic or logical operations; recording, storing, and/or transferring digital data via a wired or wireless connection with one or more network elements and/or one or more other computing devices. In this regard, the client devices may be capable of transmitting and receiving signals and/or data streams from network element(s) or other client computing device(s). To carry out such functions, the client devices may include one or more memory devices, one or more processors, and communications interfaces (see for example, FIG. 18).

The client devices may be configured to run, execute, or otherwise operate one or more applications within an application container or web browser, for example, to generate, render, and enable interaction with the interfaces. The browser/container may execute programs/scripts (for example, a client-side scripting language, such as JavaScript, Jscript, Ruby, Python, etc.) and may render markup language documents (for example, HyperText Markup Language (HTML) documents, Extensible Markup Language (XML) documents, JavaScript Object Notation (JSON) documents, etc.) and other content. Other languages, such as a proprietary scripting language, may be used as well. The client devices implementing the applications may be capable of controlling their communications circuitry to obtain and send data to/from the cloud 140, render the aforementioned interfaces in an application container or browser, request connections with other devices via an EET, and/or other like functions. Such applications may also enable the client devices to provide authentication credentials (for example, user identifier (ID), password, personal identification number (PIN), digital certificates, etc.) to the cloud 140 so that the cloud 140 may authenticate the identity of the users of the client devices.

According to various embodiments, the devices of arrangement 100 may operate as follows:

The processor(s) of the representative device 105 may implement the application (for example, by executing program code and/or software modules of the application) to establish EET 120 with the cloud via an interface 150, and generate and send a message M1 to the cloud 140 in response to a user input (for example, a selection of a GCE by a user of the representative device 105) via the established EET 120. In embodiments, the message M1 may include PRCP parameters 10, which may indicate a new or existing RCP entity 106 to which content items should be added and selected content items to be included in the indicated RCP entity 106. In some embodiments, the message M1 may include the selected content items (for example, for content items stored locally at the representative device 105) and/or may include locations or IDs of the content items to be included in the RCP entity 106 (for example, for content items stored in the content items DB 150).

Additionally or alternatively, the message M1 may include one or more selected content items. In embodiments, the interfaces may include a GCE that, when selected, causes the application to implement an upload component to provide functionality for the user of the representative device 105 to select and add individual content items for inclusion in the RCP entity 106. The upload component may be built using any suitable programming language/tools, such as Java, Flash, Silverlight, HTML5, and the like. The PRCP parameters 10 may include other information, such as one or more user IDs of users that may edit or modify the indicated RCP entity 106; one or more tags and/or topics associated with the indicated RCP entity 106; indications of one or more references (for example, which are stored in the refs. DB 155) that support the information conveyed by the content items; and/or other like parameters.

As discussed previously, the content items may be any information to be conveyed to a particular audience or end-user and may comprise various content types and/or formats. The tags and/or topics may indicate a subject or purpose of the RCP entity 106. A tag may be an easy-to-understand word, phrase, and/or series of characters which may be applied to an individual content item and/or a RCP entity 106. The tag may be indicated using a character (or other) indicator, such as a hashtag ("#"), although other indicators may be utilized in other embodiments. A topic (also referred to as a "scenario") may be a theme, setting, or sequence of events associated with a particular biological system, injury or condition, treatments, and the like. In embodiments, the tags and/or topics may be used to identify or determine particular regulatory requirements that the PRCP and/or individual content items need to comply with, and may also be used to regulate the distribution to various recipients. For example, a content item relating to a drug may be associated with a tag associated with a malady treated by the drug. In this example, a topic of the content item may be related to the drug, the malady treated by the drug, a biological system or process associated with the drug or malady, a producer or manufacturer of the drug, and/or the like; and the scenario may be related to processes or procedures for administering the drug. In this example, the representative client device 105 may be permitted to add content items to a RCP entity 106 associated with the tags and/or topics, and share the PRCP with specific providers and/or provider groups that have permission to view such content. In another example, individual content items and/or a PRCP associated with a regulated drug or medical device may be modified to facilitate compliance with regulations when the individual content items are submitted for review. A detailed description of some implementations that utilize tags and/or topics is discussed in commonly assigned U.S. patent application Ser. No. 15/201,085, titled "Taxonomy-Facilitated Actions for Content", by Anh Huynh et al., filed on Jul. 1, 2016, and hereby incorporated by reference in its entirety and for all purposes.

Additionally or alternatively, the message M1 may include a submission instruction. The submission instruction may instruct the cloud 140 to distribute the PRCP for review by one or more reviewers (for example, users of one or more reviewer devices 110). In embodiments where the message M1 includes the submission instruction, the parameters 10 may indicate various submission criteria/parameters, such as individual reviewer IDs, which correspond to the users that are to review the PRCP via their reviewer devices 110. The reviewer IDs may be any suitable unique identifier, such as a login credential (for example, user name), an email address, social network ID or handle, an employee ID number, a phone number, and/or the like.

In response to receipt of the message M1, the cloud 140 (or portion thereof) may generate or edit an RCP entity 106, which may be stored in the RCP DB 165. When the parameters 10 indicate to add or delete content items from an already existing RCP entity 106, the cloud 140 may update and/or add information the data elements to that RCP entity 106. When the parameters 10 indicate that a new RCP entity 106 should be created, the cloud 140 (or portion thereof) may generate a new RCP entity 106 including the various database elements, and add information to those data elements. Updating and/or adding information to the data elements of the RCP entity 106 may include identifying the selected content items in the content items DB 150 and storing identifiers or links to those content items in corresponding data elements of the RCP entity 106; obtaining the selected content items from the message M1, storing those content items in the content items DB 150, and storing identifiers or links to those content items in corresponding data elements of the RCP entity 106; storing other parameters 10 indicted by the message M1 (for example, user data, etc.) in corresponding data elements of the RCP entity 106; and generating links to one or more references stored in the refs. DB 155 and storing those links corresponding data elements of the RCP entity 106. Additionally, the cloud 140 may store a "proposed" value (for example, a number, character, string, etc.) in a status field of the RCP entity 106 to indicate that the RCP entity 106 is a PRCP. In some embodiments, each of the content items of the PRCP may be associated with a corresponding status field, where each status field may store values indicating whether a content item is approved for distribution or not.

In some embodiments, the cloud 140 (or portion thereof) may analyze the selected content items for compliance with regulations, which may be accomplished using, for example, any suitable data validation functions, machine learning algorithms, and the like. This may include identifying rules from the rules DB 160 that are associated with the tags and/or topics indicated by the message M1, and identifying and flagging certain words (or combinations thereof) in the content items that are indicated as not permitted by the identified validation rules. The validation rules stored in the rules DB 160 may be any constraints and/or standards for conveying information for particular content items, tags, topics, etc. In an example, the cloud 140 (or portion thereof) may identify words by implementing a suitable word matching algorithm and/or optical character recognition for text and/or image content items, and/or by implementing a speech recognition algorithm for audio and/or video content items. The words may be flagged by highlighting or otherwise visually distinguishing the identified words from other words in the content items, or by providing a separate list of links to each flagged section within the content items.

Once the RCP entity 106 is created or edited, the cloud 140 (or portion thereof) may generate a message M2 to include PRCP parameters 11. The parameters 11 may comprise one or more data structures in a format that can be interpreted and rendered by the client devices, such as HTML, XML, JSON, and/or some other suitable data format that may be decoded and rendered by an application container and/or browser. The parameters 11 may include instructions for generating an interface for accessing the RCP entity 106, such as obtaining and/or displaying the content items of the PRCP and for displaying the various tags, topics, links to references, and/or flagged words or word combinations. In some embodiments, the cloud 140 may store the parameters 11 in data elements of the RCP entity 106.

In some embodiments, the cloud 140 (or portion thereof) may then establish an EET 125 with the reviewer device 110 and send the message M2 to the reviewer device 110 over the EET 125. In other embodiments, the cloud 140 may send the message M2 as an invitation to establish the EET 125. In such embodiments, the message M2 may include a link or GCE, which when selected or activated, launches a browser or application container and generates an interface to establish the EET 125 and/or for accessing the PRCP.

Having established EETs 120 and 125, the cloud 140 may pass messages between the representative device 105 and the reviewer device 110 such that it appears, from the perspective of the client devices, as though there is an EET between the representative device 105 and the reviewer device 110 (not shown by FIG. 1). In some embodiments, at least one of the servers 145 may be implemented to translate and pass messages between the representative device 105 and the reviewer device 110 by performing port forwarding or mapping, network address translation, packet routing, bridging, etc.

Once the parameters 11 are obtained by the reviewer device 110, the reviewer device 110 may implement an application to decode and render the PRCP parameters 11. The PRCP parameters 11, when decoded and rendered, may provide various interfaces (for example, GUIs and/or GCEs) that allow the user of the reviewer device 110 to view the content items of the PRCP, edit the PRCP and/or individual content items of the PRCP. Editing the PRCP may include providing comments on certain aspects of the PRCP, altering the information conveyed by the individual content items, and/or altering a format or layout of the PRCP. In this regard, the interfaces may provide GCEs that allow the user of the reviewer device 110 to enter, mark-up, or otherwise format text, format, and/or layout of the PRCP and/or individual content items. In some embodiments, the interfaces may provide control elements for editing audio or video content (for example, using a non-linear editing system and the like) included in the PRCP. Additionally, the interfaces may also include a GCE that allows the reviewer device 110 to submit an approval indication to the cloud 140 when the PRCP is approved for publication by the reviewer device 110. In the example of FIG. 1, the user of the reviewer device 110 may be responsible for evaluating the PRCP for compliance with a regulatory scheme, and may use the interfaces generated using the PRCP parameters 11 for this purpose.

To provide edits for the PRCP, the reviewer device 110 may generate PRCP parameters 12, which indicate the various edits/revisions made to the PRCP by the reviewer device 110. The reviewer device 110 may also generate a message M3 to include the PRCP parameters 12, and may send the message M3 to the cloud 140 over the EET via EET 125. The message M3 may include one or more data structures that are the same or similar to the data structures included in the messages M1 and M2. When the cloud 140 obtains the message M3, the cloud 140 may store the parameters 12 in the RCP entity 106 by adding the parameters to corresponding data elements. The representative device 105 may then retrieve the PRCP parameters 12 in a message M4 from the cloud 140 over the EET via EET 120. The message M4 may also include data structures similar to those previously discussed, which when rendered by the representative device 105, provides various interfaces that allow the user of the representative device 105 to view the edited version of the PRCP, as well as interfaces that allow the user of the representative device 105 to make further edits to the PRCP. These interfaces may be the same or similar to those provided to the reviewer device 110 as discussed previously.

The procedure discussed previously with respect to messages M1 to M4 may be repeated until the user of the reviewer device 110 selects the GCE for providing approval indication to the cloud 140. In some embodiments, the interfaces provided to the representative device 105 and the reviewer device 110 may include GCEs to control submission of the parameters 10 and 12 (for example, a submit button and the like). In this way, individual client devices may each submit a plurality of edits to the cloud 140 in a single message.

In other embodiments, the procedure discussed previously with respect to messages M1 to M4 may operate in real-time or near real-time in that the representative device 105 and the reviewer device 110 may continuously exchange various messages M1-M4 until the approval indication is sent to the cloud 140. In some implementations, in order to provide the real-time or near real-time operation, individual messages M1 and M3 including parameters 10 and 12, respectively, may be generated and transmitted over the EET between the representative device 105 and the reviewer device 110 each time a user selects an individual GCE on their client device. For example, the representative device 105 may generate and send a first message M1 upon selection of a content item to add to a PRCP, may generate and send a second message M1 upon detecting a text input to be associated with the content item, and may generate and send a third message M1 upon selection of a GCEs to control submission of the submission instruction. In this example, the reviewer device 110 may generate and send individual messages M3 each time comments or revisions are input into the interfaces, and the cloud 140 may translate the individual messages M3 into individual messages M4 for delivery to the representative device 105.

When the user of the reviewer device 110 approves of the PRCP, the reviewer device 110 may generate another message M3 with PRCP parameters 12 that include the approval indication. In some embodiments, the interfaces may allow the user of the reviewer device 110 to select individual content items of the PRCP to approve, and in such embodiments, the approval indication may indicate those individual content items. Once the cloud 140 obtains the approval indication, the cloud 140 may convert the PRCP into an ARCP by, for example, changing a value of the status field of the RCP entity 106 to include an "approved" value or some other suitable value. Where the individual content items of the PRCP may be individually approved, the cloud 140 may convert the PRCP into an ARCP by changing the value of the status fields for the content items to an "approved" value.

The cloud 140 may then generate and send another message M4 to the representative device 105, which includes other PRCP parameters 12 that, when decoded and rendered, may indicate that the RCP (or portions thereof) have been approved (for example, that the PRCP has been converted into an ARCP). In embodiments, the interfaces generated and rendered by the representative device 105 may display a visual indication that the PRCP has been approved, and/or a visual indication that one or more content items of the PRCP have been approved (see for example, FIGS. 7 and 8). In some embodiments, the interfaces generated and rendered by the representative device 105 may visually distinguish the content items of the ARCP that are approved and content items of the ARCP that have not been approved (if any), for example, by greying-out the unapproved content items and/or the like.

In embodiments, the interfaces generated and rendered by the representative device 105 may include a GCE to control distribution of the ARCP to recipient devices 115. These interfaces may also include GCEs to indicate intended recipient devices 115 to which the ARCP should be distributed. For example, these GCEs may include text boxes, drop-down lists, etc. that allow the user of the representative device 105 to indicate recipient IDs (for example, email address, social network ID or handle, phone number, etc.) and/or other like identifying information of intended recipient devices 115, such as a recipient class (for example, field of expertise, practice groups, etc.), topic, scenario, or other like information. When the user of the representative device 105 selects the GCE for distribution, the representative device 105 may generate a message M5 including distribution parameters 13. The distribution parameters 13 may indicate that the ARCP may be distributed to individual recipient devices 115, and may also indicate the intended recipient devices 115 that should receive the ARCP. The message M5 may be the same or similar to the other messages discussed herein.

In response to receipt of the message M5, the cloud 140 may identify the intended recipient devices 115 from the distribution parameters 13 and determine whether the intended recipient devices 115 are permitted to view one or more of the content items in the ARCP. In embodiments, the cloud 140 may determine access permissions associated with the intended recipient devices 115 and may compare metadata of the ARCP (for example, topic information, scenario information, etc.) with the access permissions.

The cloud 140 may generate messages M6 for the recipient computer devices 115 that are permitted to access at least one of the content items included in the ARCP. The cloud may then establish corresponding channels 130 with the identified recipient devices 115 and send the messages M6 to the identified recipient devices 115 over the corresponding channels 130. Having established channels 120 and 130, the cloud 140 may establish corresponding EETs between the representative device 105 and each of the identified recipient devices 115 through the channels 120 and 130. As discussed previously, at least one of the servers 145 may be implemented to pass messages between the representative device 105 and the identified recipient devices 115 by performing port forwarding or mapping, network address translation, packet routing, bridging, etc.

The message M6 may include ARCP parameters 14 that, when decoded and rendered by the recipient devices 115, may provide an interface for accessing the content items of the ARCP. In one example, the interface may include an inline frame (iframe) that invokes a proprietary content viewer for viewing the content items of the ARCP. Other interfaces may be used in other embodiments.

Additionally, in various embodiments the cloud 140 may prevent or block access to unapproved content items of the ARCP. In some embodiments, links to the unapproved content items may not be included in the interfaces generated using the parameters 14. In other embodiments, links to the unapproved content items may visually distinguished from the approved content items. In other embodiments, a content viewer embedded in the interfaces may be used to block access to unapproved content items. The term "unapproved content items" may refer to content items that have not yet been reviewed by the reviewer devices 110 and/or content items that were not approved for distribution to particular recipient devices 115.

The interfaces generated and rendered by the recipient devices 115 may include GCEs to evaluate the ARCP. For example, these GCEs may include text boxes, drop-down lists, etc. that allow the user of the recipient devices 115 to provide comments on the ARCP and/or individual content items of the ARCP. When a user of the recipient device 115 activates this GCE, the representative device 105 may generate a message M7 including evaluation parameters 15. The evaluation parameters 15 may include an identifier of the ARCP and/or an individual content item of the ARCP, as well as the evaluation information (for example, comments) of the individual content item and/or the ARCP. The message M7 may be the same or similar to the other messages discussed herein. The evaluation information and/or other information conveyed by parameters 15 may be stored in corresponding fields/data elements of the RCP entity 106.

The cloud 140 may then generate and send another message M6 with other parameters 14, which when decoded and rendered by the recipient devices, may display interfaces for the recipient devices to view the evaluation information in a same or similar manner as discussed previously. In addition, the cloud 140 may generate and send a message to the representative device 105 (for example, a message M4) so that the representative may also view the evaluation information. The procedure discussed previously with respect to messages M6 to M7 may be repeated as necessary in a similar manner as discussed previously with regard to messages M1 to M4. Additionally, having established EETs 120 and 130, the cloud 140 may pass messages between the representative device 105 and the recipient devices 115 in such a manner that it appears as though there is an EET between the representative device 105 and the recipient devices 115 (not shown by FIG. 1). This may be accomplished in a same or similar manner as discussed previously with regard to EETs 120 and 125 between the representative device 105 and the reviewer device 110.

As used herein electronic messages, including the electronic messages M1, M2, M3, M4, M5, M6, M7, etc. may be of a variety of message types including but not limited to text messages, multimedia messages, electronic mail (e-mail) messages, hyper-text transfer protocol (HTTP) messages, files (either coupled to one of the earlier described message types or transferred independently), publish/subscribe messages, and the like delivered over appropriate channel delivery services including but not limited to simple messaging service (SMS), multimedia messaging service (MMS), the Internet and the like. The electronic messages may be delivered according to a variety of message transfer protocols including but not limited to transmission control protocol/Internet protocol (TCP/IP), simple mail transfer protocol (SMTP), HTTP, WebSocket, file transfer protocol (FTP), and protocols directed toward communication of markup language files ((for example, XML) such as, simple object access protocol (SOAP), XML-remote procedure call (RPC), Global XML Web Services Architecture (GXA), Representational State Transfer (REST), Extensible Messaging and Presence Protocol (XMPP), and the like. The message transfer protocols may operate in conjunction with the previously described tunneling protocols. As used herein, the particular message type and corresponding services, protocols, structures, etc. to communicate that particular message type from one device to another over the network may be referred to as a "channel", "delivery channel", "secure channel", and the like.

The depiction of the arrangement 100 should be taken as being illustrative in nature, and not limited to the scope of the disclosure. For example, although FIG. 1 shows a single representative device 105, a single reviewer device 110, and a single recipient device 115, any number of client devices may be present. Additionally, any number of servers 145 and/or DBs 150-170 may be present.

FIGS. 2-5 illustrate example processes 200-500, respectively, in accordance with various embodiments. For illustrative purposes, the operations of each of processes 200-500 are described as being performed by a computer device as described with respect to FIG. 1. However, it should be noted that other similar devices/entities may also operate the processes 200-500. For each of processes 200-500, one of the computer devices shown and described with regard to FIG. 1 may include one or more non-transitory computer-readable media having instructions stored thereon, which when executed by one or more processors of a computer device, may cause the computer device to perform processes 200-500. Additionally, while particular examples and orders of operations are illustrated in FIGS. 2-5, in various embodiments, these operations may be re-ordered, broken into additional operations, combined, and/or omitted altogether. Furthermore, in some embodiments the operations illustrated in one of FIGS. 2-5 may be combined with operations described with regard to other example embodiments and/or one or more operations described with regard to the non-limiting examples provided herein.

Figure 2:
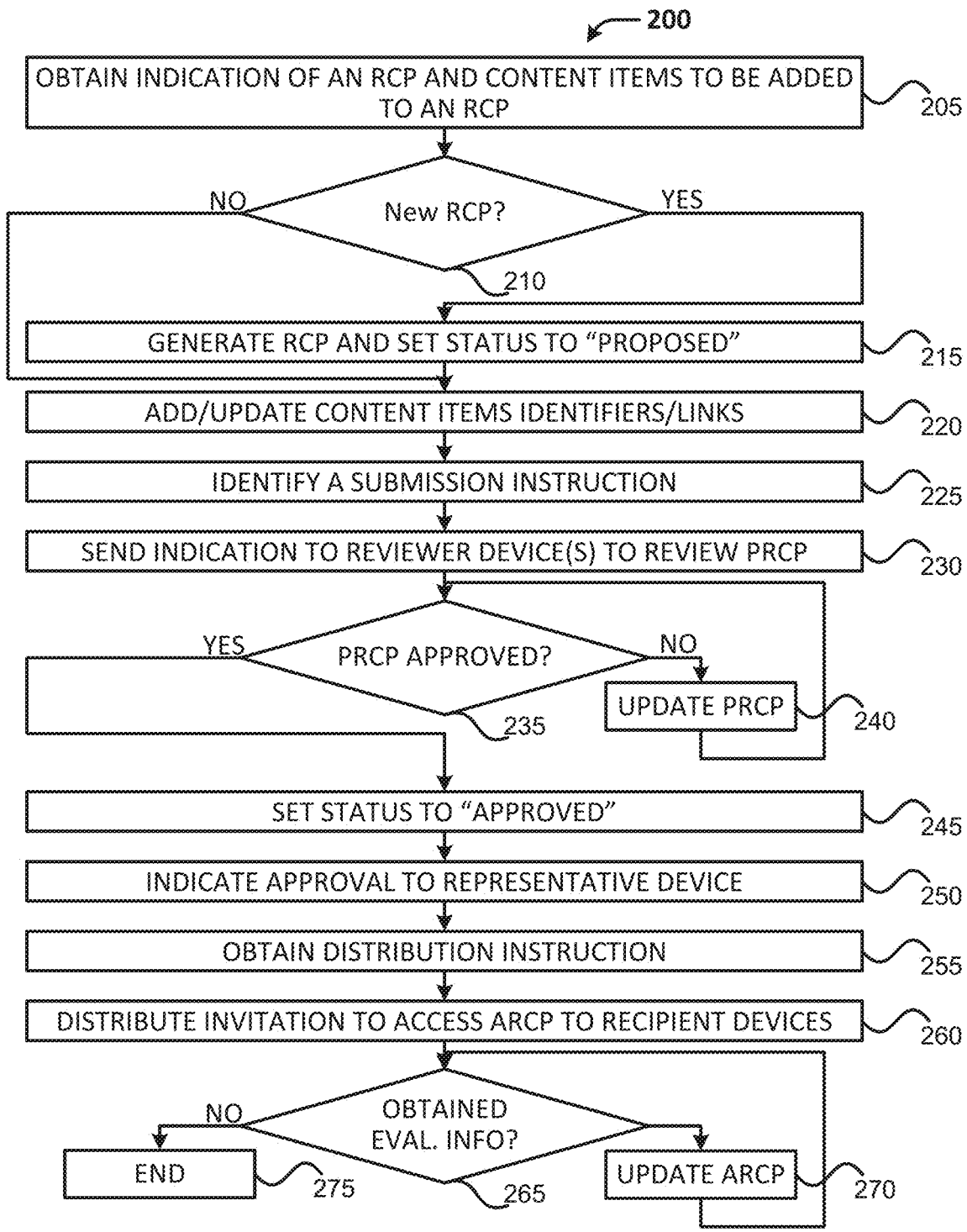
FIG. 2 illustrates an example process for regulating distribution of a regulated content playlist, in accordance with various embodiments.

Referring now to FIG. 2, an example process 200 for regulating distribution of an RCP is illustrated. Process 200 may be performed by a remote system, such by the cloud 140 or the one or more servers 145 within the cloud 140.

Process 200 may begin at operation 205, where the cloud 140 obtains an indication of an RCP and content items to be added to the indicated RCP. In various embodiments, the cloud 140 may establish an EET 120 with a representative device 105, and the indication may be obtained from the representative device 105 in an electronic message over the EET 120 (for example, the message M1 of FIG. 1). In some embodiments, the electronic message may indicate content items stored in the content items DB 150. In some embodiments, the representative device 105 may implement an upload component to provide one or more content items with the electronic message or in a separate electronic message. In such embodiments, the cloud 140 may store the obtained content items in the content items DB 150.

At operation 210, the cloud 140 may determine whether the indicated RCP is a new RCP, as opposed to an already existing RCP. If at operation 210, the cloud 140 determines that the indicated RCP is not a new RCP, then the cloud 140 may proceed to operation 220 to add or update the RCP with links/identifiers for the content items indicated by the electronic message obtained at operation 205.

If at operation 210, the cloud 140 determines that the indicated RCP is a new RCP, then the cloud 140 may proceed to operation 215 to generate the RCP and set an associated status of the RCP to indicate that the RCP is a PRCP. In embodiments, at operation 215 the cloud 140 may generate an RCP entity 106 including a status field, and may set the status field to "proposed."

At operation 220, the cloud may add and/or update the content item identifiers or links. In embodiments, the cloud 140 may add content item identifiers or links to corresponding fields in the RCP entity 106, and/or may update existing fields with new content item identifiers or links. A content item identifier or link may refer to a location of the content item in the content items DB 150.

At operation 225, the cloud 140 may identify a submission instruction. In embodiments, the representative device 105 may send this instruction in an electronic message (for example, a message M1 of FIG. 1) to instruct the cloud 140 to invite one or more reviewer devices 110 to review the PRCP. In some embodiments, the submission instruction may include one or more reviewer IDs, or the reviewers may be selected by the cloud 140. The selection of reviewer devices 110 may be based on geographical location of a reviewer device 110 and/or intended audience; reviewer expertise or knowledge levels; access permission levels; association with particular facilities, networks, practices, etc.; association with particular professional groups; practice specialties of content in the PRCP; preferred language(s); etc.

At operation 230, the cloud 140 may send an indication to the reviewer device(s) 110 to access the PRCP for review. In embodiments, the cloud 140 may establish individual EETs 125 with each of the reviewer devices 110 and provide the reviewer devices 110 with interfaces to access the PRCP (for example, in a message M2 of FIG. 1).

At operation 235, the cloud may determine whether the PRCP has been approved by the reviewer device(s) 110. In embodiments, this determination may be based on an approval indication obtained by the cloud 140 in an electronic message (for example, a message M3 of FIG. 1). If at operation 235 the cloud 140 determines that the PRCP has not been approved, then the cloud 140 may proceed to operation 240 to update the PRCP with edits from the reviewer device 110 and loops back to repeat operation 235. If at operation 235 the cloud 140 determines that the PRCP has been approved (for example, an approval indication has been obtained from the reviewer device 110), then the cloud 140 may proceed to operation 245 to set the status of the RCP to "approved," such as by editing the value of the status field of the RCP entity 106 to include an "approved" value. This may convert the PRCP into an ARCP.

In some embodiments, the PRCP may be subject to review by a plurality of reviewers at various stages. In such embodiments, each stage may include one or more reviewers that may provide edits and approval indications. In some embodiments, a stage may include reviewers that have the same or similar authority, clearance, or permission level, and each successive stage may include reviewers with higher permission levels than a subsequent stage. Additionally, approval indications from some or all reviewer devices 110 at a particular stage may be required in order for the PRCP to be reviewed by reviewer devices 110 at a next stage (see for example, discussion of FIG. 9 infra).

At operation 250, the cloud 140 may indicate the approval to the representative device 105. In embodiments, the cloud 140 may send an approval indication to the representative device 105, which may be rendered in an interface at the representative device 105.

At operation 255, the cloud 140 may obtain a distribution instruction, for example, in an electronic message (for example, a message M5 of FIG. 1) from the representative device 105. In embodiments, the distribution instruction may include recipient IDs to indicate desired recipient devices 115 that should receive the invitation. In other embodiments, the cloud 140 may select the recipient devices 115 that are to receive the invitation. In such embodiments, the cloud 140 may select recipient devices 115 based on recipient criteria, such as access permissions; geographical location; association with particular provider facilities, hospitals, hospital networks, distributor networks, call centers, practices and/or clinics; association with particular professional groups; practice specialties; patient population information; preferred language; etc. In some embodiments, the recipient criteria may include information regarding content items that a recipient device 115 has obtained, requested, downloaded, or forwarded to other recipient devices 115, such as journal articles, publications, literature produced/published by pharmaceutical manufacturers and/or medical device manufacturers, video content, and/or other like media. Such information may be obtained using processes described by U.S. application Ser. No. 13/032,461 titled "Tracking Digital Content Objects," U.S. application Ser. No. 13/841,982 titled "System for Multi-Point Publication Syndication," U.S. application Ser. No. 14/511,140 titled "Selective Sharing of Electronic Information", which are hereby incorporated by reference in its entirety and for all purposes.

In response to the distribution instruction, at operation 260, the cloud 140 may distribute an invitation to access the ARCP to one or more recipient devices 115. In embodiments, the cloud 140 may establish individual EETs 130 with each of the one or more recipient devices 115. The recipient devices 115 may then implement an application, which may be executed in an application container or browser, that is capable of accessing the ARCP. Furthermore, the cloud 140 may prevent or block access to certain content items of the ARCP based on access permissions associated with each of the recipient devices 115.

At operation 265, the cloud 140 may determine whether any evaluation information has been submitted by any of the recipient devices 115. Such evaluation information may include comments on individual content items of the ARCP and the like. If at operation 265 the cloud 140 determines that evaluation information has been obtained, then the cloud 140 may proceed to operation 270 to update the ARCP with the evaluation information and loops back to perform operation 265. Operation 270 may include storing the evaluation information for an individual content item in association with the ARCP, which may then be provided to the representative device 105 and/or other recipient devices 115 when the individual content item is accessed. If at operation 265 the cloud 140 determines that no evaluation information has been obtained, then the cloud 140 may proceed to operation 275 to end process 200. After completion of the various operations of process 200, the cloud 140 may repeat the process as necessary, in whole or in part, at various times.

Figure 3:
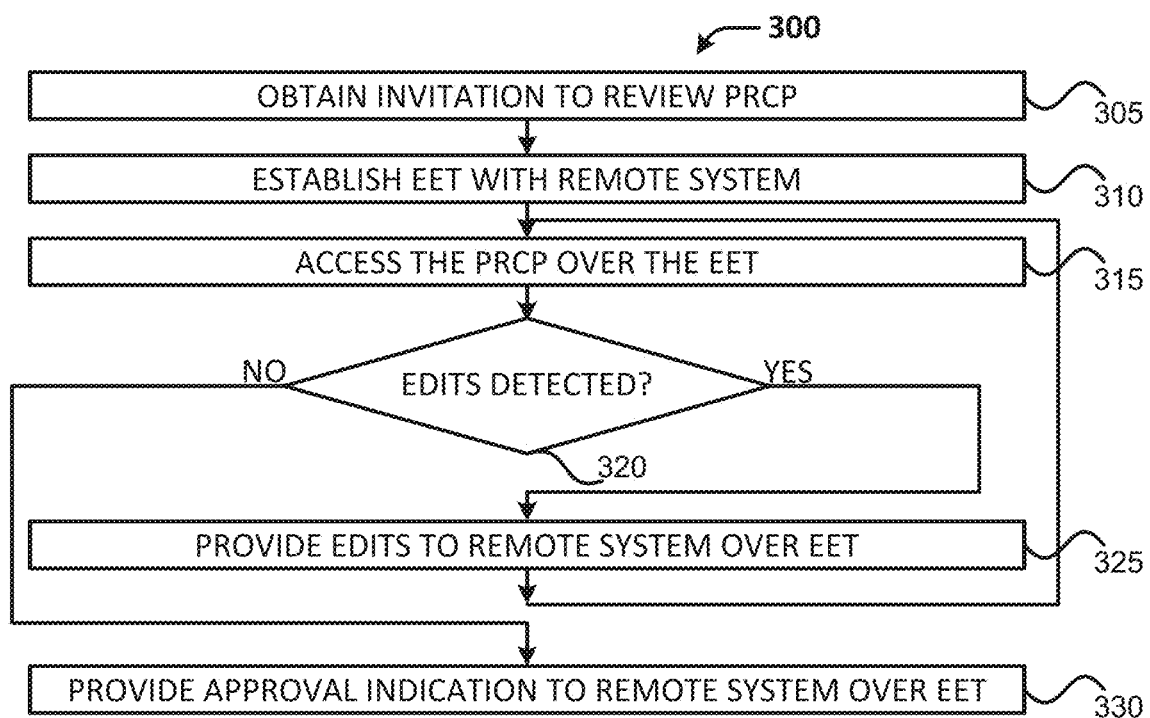
FIG. 3 illustrates n example process for reviewing and approving a regulated content playlist, in accordance with various embodiments.

Referring now to FIG. 3, an example process 300 for reviewing and approving an RCP is illustrated. Process 300 may be performed by a reviewer device 110. For example, the reviewer device 110 may implement an application, which may be executed in an application container or browser, that is capable of accessing various interfaces for performing the various operations of process 300 as discussed infra.

The process 300 may start at operation 305, where the reviewer system 110 may obtain an invitation to review a PRCP. At operation 310, the reviewer system 110 may establish an EET 125 with a remote system (for example, the cloud 140). At operation 315, the reviewer system 110 may access the PRCP over the EET 125.

In some embodiments, the invitation may be in the form of an electronic message (for example, a message M2) that includes parameters 11, which when decoded and rendered by a browser and/or application container of the reviewer device 110, generates interfaces that allow a user of the reviewer device to access content items of the PRCP. In other embodiments, the invitation may be in the form of an electronic message (for example, a message M2) that includes a link or GCE, which when selected or activated by the user of the reviewer device 110, executes an application or browser that is capable of generating an interface for accessing the PRCP. In such embodiments, the electronic message may be an e-mail, SMS/MMS, a push notification, and/or the like.

At operation 320, the reviewer device 110 may determine whether any edits are detected. In an example, operation 320 may include detecting any user inputs, such as text, gestures or touches, voice commands, and/or the like. These user inputs may indicate changes that the user of the reviewer device 110 wishes to make to the PRCP and/or individual content items. If at operation 320, the reviewer device 110 determines that edits have been detected, then the reviewer device 110 may proceed to operation 325 to provide the edits to the remote system (for example, in a message M4) and may then proceed back to operation 315 to access an updated version of the PRCP over the EET 125. The updated version of the PRCP may include changes to the PRCP and/or individual content items based on the edits detected at operation 320.

If at operation 320, the reviewer device 110 determines that edits have not been detected, then the reviewer device 110 may proceed to operation 330 to provide an approval indication to the remotes system over the EET 125 (for example, in another message M3). In embodiments, the interfaces generated at the reviewer device 110 may include a GCE, which when selected/activated, may cause the application implemented by the reviewer device 110 to generate and send an approval indication in a message M3. After completion of the various operations of process 300, the reviewer device 110 may repeat the process as necessary, in whole or in part, at various times.

Figure 4:
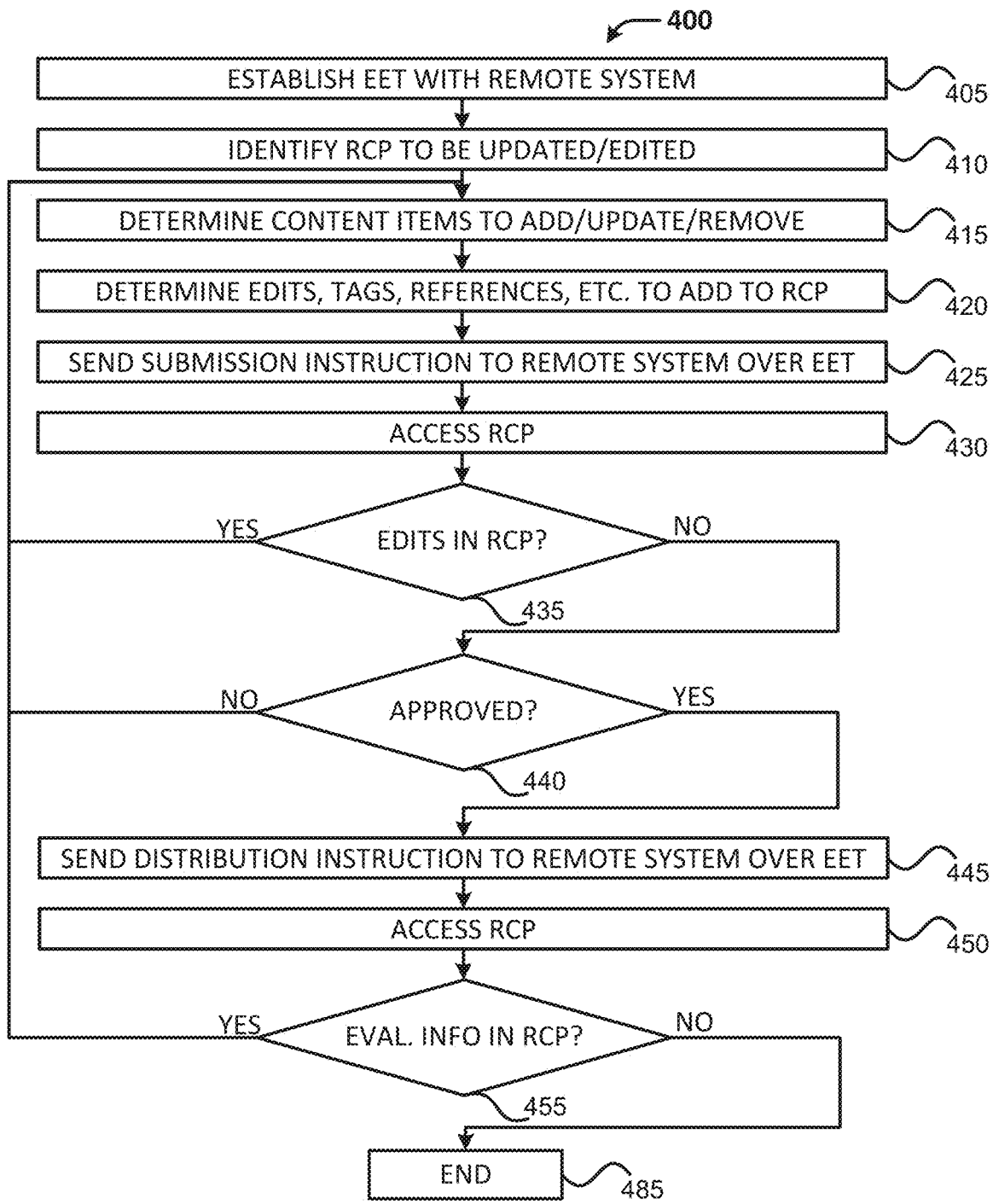
FIG. 4 illustrates an example process for generating and distributing a regulated content playlist, in accordance with various embodiments.

Referring now to FIG. 4, an example process 400 for generating and distributing an RCP is illustrated. Process 400 may be performed by a representative device 105. For example, the representative device 105 may implement an application, which may be executed in an application container or browser, that is capable of accessing various interfaces for performing the various operations of process 400 as discussed infra.

The process 400 may start at operation 405, where the representative device 105 may establish an EET 120 with a remote system, such as the cloud 140. At operation 410, the representative device 105 may identify an RCP to be updated and/or edited, for example, by adding, deleting, rearranging an order of content items included in the RCP. At operation 415, the representative device 105 may determine content items to add, update, remove, etc. to/from the identified RCP. At operation 420, the representative device 105 may determine edits, tags, reference items, etc. to add to or associated with the identified RCP. At operation 425, the representative device 105 may send a submission instruction to the remove system over the established EET 120, and at operation 430, the reviewer device 105 may access the RCP. In some embodiments, the representative device 105 may generate and send an electronic message (for example, a message M1) after performing each of operations 410-425, and operation 430 may be performed after each of the operations 410 (for example, the RCP may be refreshed after each user interaction with the interfaces).

At operation 435, the representative device 105 may determine whether there are any edits in the RCP. The edits may be obtained provided by one or more reviewer devices 110 as discussed previously with regard to process 300 of FIG. 3, for example. If at operation 435 the representative device 105 determines that there are edits in the RCP, then the representative device 105 may proceed back to perform operations 415-430 in order to address the comments/revisions provided by the reviewer devices 110.

If at operation 435 the representative device 105 determines that there are no edits in the RCP, then the representative device 105 may proceed back to operation 440 to determine whether the RCP has been approved. In embodiments, operation 440 may include obtaining an approval indication in an electronic message (for example, a message M4 of FIG. 1) from the remote system. If at operation 440 the representative device determines that the RCP has not been approved, then the representative device 105 may proceed back to perform operations 415-430. In other embodiments, the representative device may wait until the RCP is approved without proceeding back to operation 415. If at operation 440 the representative device determines that the RCP has been approved, then the representative device 105 may proceed to operation 445 to send a distribution instruction to the remote system over the EET 120. In embodiments, the distribution instruction may instruct the remote system to invite one or more recipient devices to access the approved RCP.

At operation 455, the representative device 105 may determine whether any evaluation information has been added to the RCP by any of the recipient devices 115. Such evaluation information may include comments on individual content items of the ARCP and the like. If at operation 455 the representative device 105 determines that evaluation information has been included in the ARCP, then the representative device 105 may proceed back to perform operations 415-450 in order to address the comments/revisions provided by the recipient devices 115, if necessary. If at operation 455 the representative device 105 determines that no evaluation information has been included in the ARCP, then the representative device 105 proceed to operation 460 to end process 400. After completion of the various operations of process 400, the cloud 140 may repeat the process as necessary, in whole or in part, at various times.

FIGS. 5-17 illustrate example interfaces facilitated by a remote system (for example, the cloud 140 of FIG. 1) according to various techniques described herein. In particular, each of FIGS. 5-17 illustrate example interfaces that may be displayed on a representative device 105 (such as the various GUIs and GCEs discussed previously). The example interfaces may be displayed or rendered by a RCP dedicated application implemented by the representative device 105. While particular example interfaces are illustrated, in various embodiments, other interfaces may be utilized. Additionally, while the examples of FIGS. 5-17 may be generated by modules of a device associated with the representative, in other embodiments, the interfaces may be generated, in whole or in part, by modules at the remote system and presented by communication modules of the representative's device 105 (for example, the device communications modules may include a browser displaying one or more web pages provided by the remote system).

FIGS. 5-9 illustrate example interfaces for generating an RCP, in accordance with various example embodiments. At FIG. 5, an example instance 500 of a GUI 20 shows a listing of PRCPs (referred to as "projects" in FIGS. 5-9). The instance 500 of the GUI 20 shown by FIG. 5 may occur as a result of requesting a filtered list of PRCPs from the cloud 140. As illustrated, the GUI instance 500 may include GCEs 505A-F (collectively referred to as "GCEs 505" or "GCE 505"), tags 506A-C (collectively referred to as "tags 506"), and a GCE 510.

Figure 5:
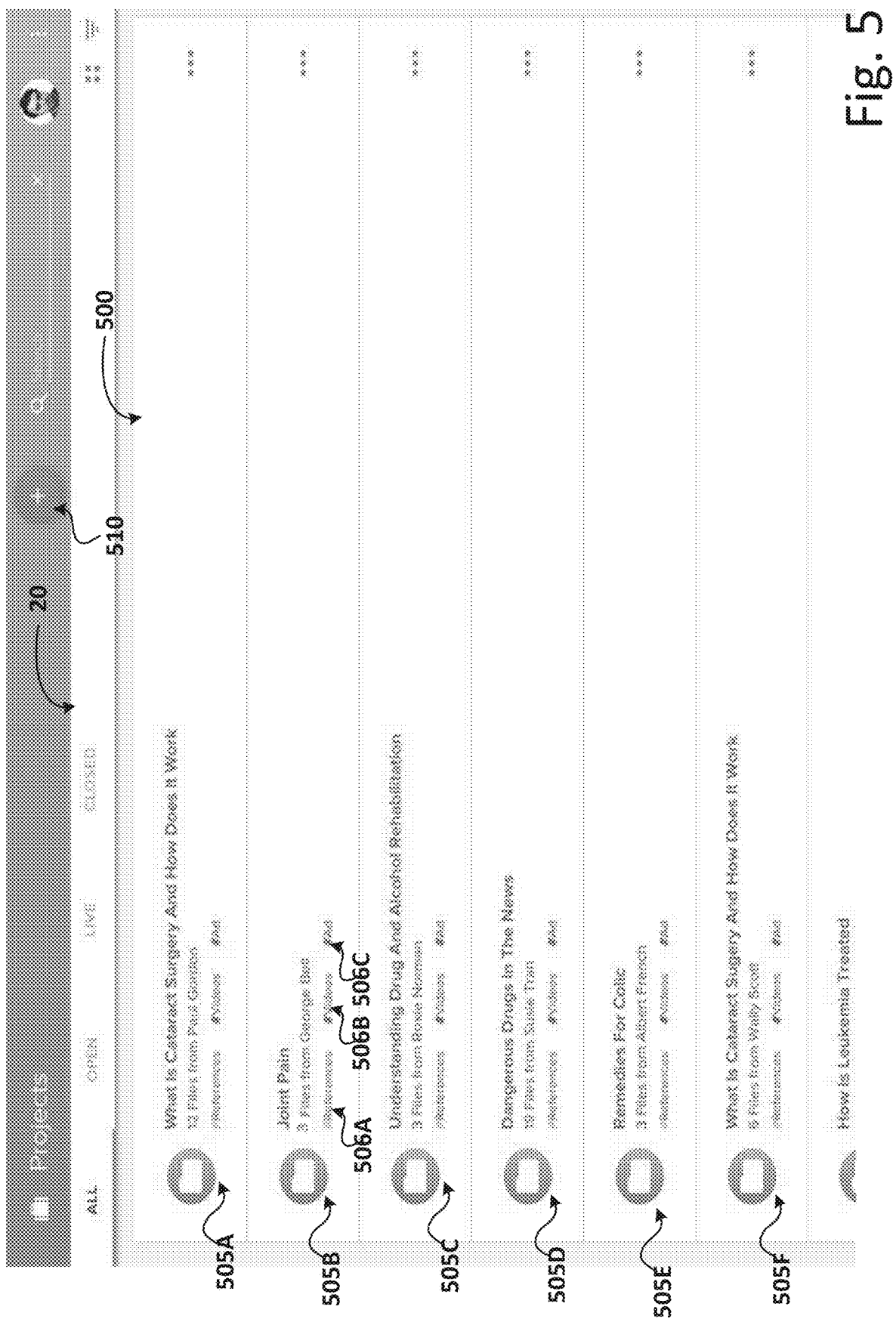
FIGS. 5-9 illustrate example interfaces for generating a regulated content playlist, in accordance with various embodiments.

Each of the GCEs 505 may be associated with a corresponding PRCP. For example, as shown by FIG. 5, GCE 505B may be associated with a PRCP titled "Joint Pain". The title of the PRCP may indicate a subject, topic, scenario, etc. of the PRCP, which may be used as a basis for controlling distribution of the PRCP to reviewer devices 110 and/or recipient devices 115 (for example, when the PRCP is converted into an ARCP). The GCE 505B also lists an author or creator of the PRCP (for example, "George Bell") and may also indicate a number of individual content items included in the PRCP (for example, "3 Files"). The GCEs 505 may also indicate tags 506 associated with the PRCP. For example, as shown, GCE 505B is associated with tag 506A that indicates that reference items are included in the PRCP (for example, "# References"), tag 506B that indicates that video content items are included in the PRCP (for example, "# Videos"), and tag 506C that indicates that the PRCP includes content items that may be classified as advertisements (for example, "# Ad"). Other tags may be indicated by the GCEs 505. GCE 510 may, when selected by clicking (for example, using a mouse-cursor interface) or tapping (for example, using a touchscreen interface), generate an instance 600 of the GUI for creating a new RCP, which is shown by FIG. 6.

Figure 6:
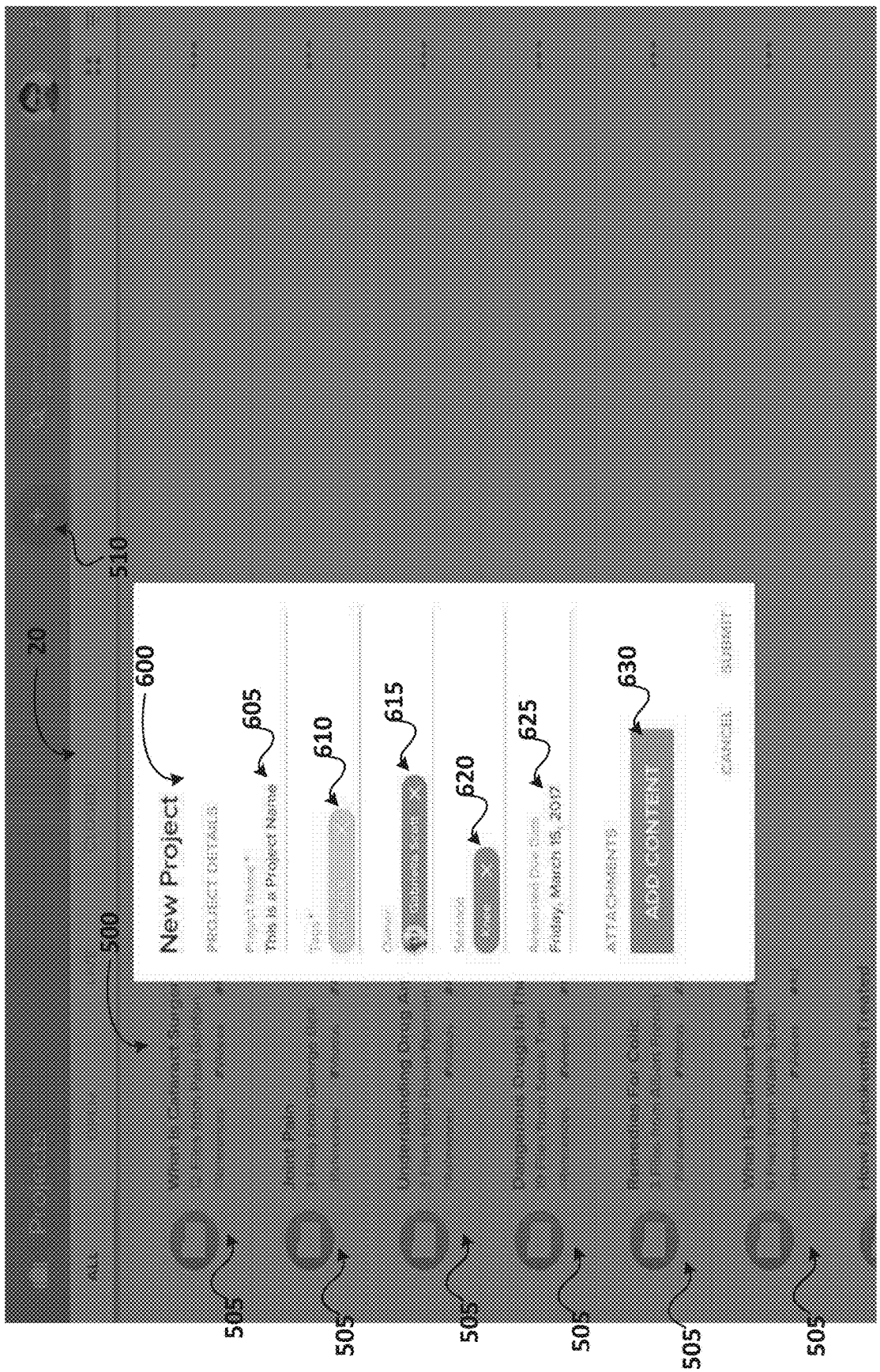

FIG. 6 illustrates an example instance 600 of the GUI 20 for creating a new RCP in accordance with various embodiments. In FIG. 6, like numbered items are the same as those described with respect to FIG. 5. As shown by FIG. 6, the GUI instance 600 may be an interface superimposed or overlaid on top of the GUI instance 500 of FIG. 5. The instance 600 may include GCEs 605-630, which allow a user of representative device 105 to create a new RCP. The user of representative device 105 may select desired RCP criteria to add to the new RCP by clicking/tapping at or near the desired RCP criteria. For example, the GCEs 605-620 may be text boxes, where the user may tap/click in the text boxes to enter a PRCP name in GCE 605, enter a tag in GCE 610, enter an owner/author/creator in GCE 615, and enter a scenario in GCE 620. The GCE 625 may be a drop down list or scrollable list element that allows the user to select a desired review date for the PRCP, which may indicate a time/date that the user wishes to obtain approval from one or more reviewer devices 110. GCE 630 may be a button or other like GCE that allows the user to added content items. Once the GCE 630 is selected, the representative device 105 may generate another instance of the GUI (not shown) comprising an upload component to provide functionality to select and add individual content items for inclusion in the PRCP.

Figure 7:
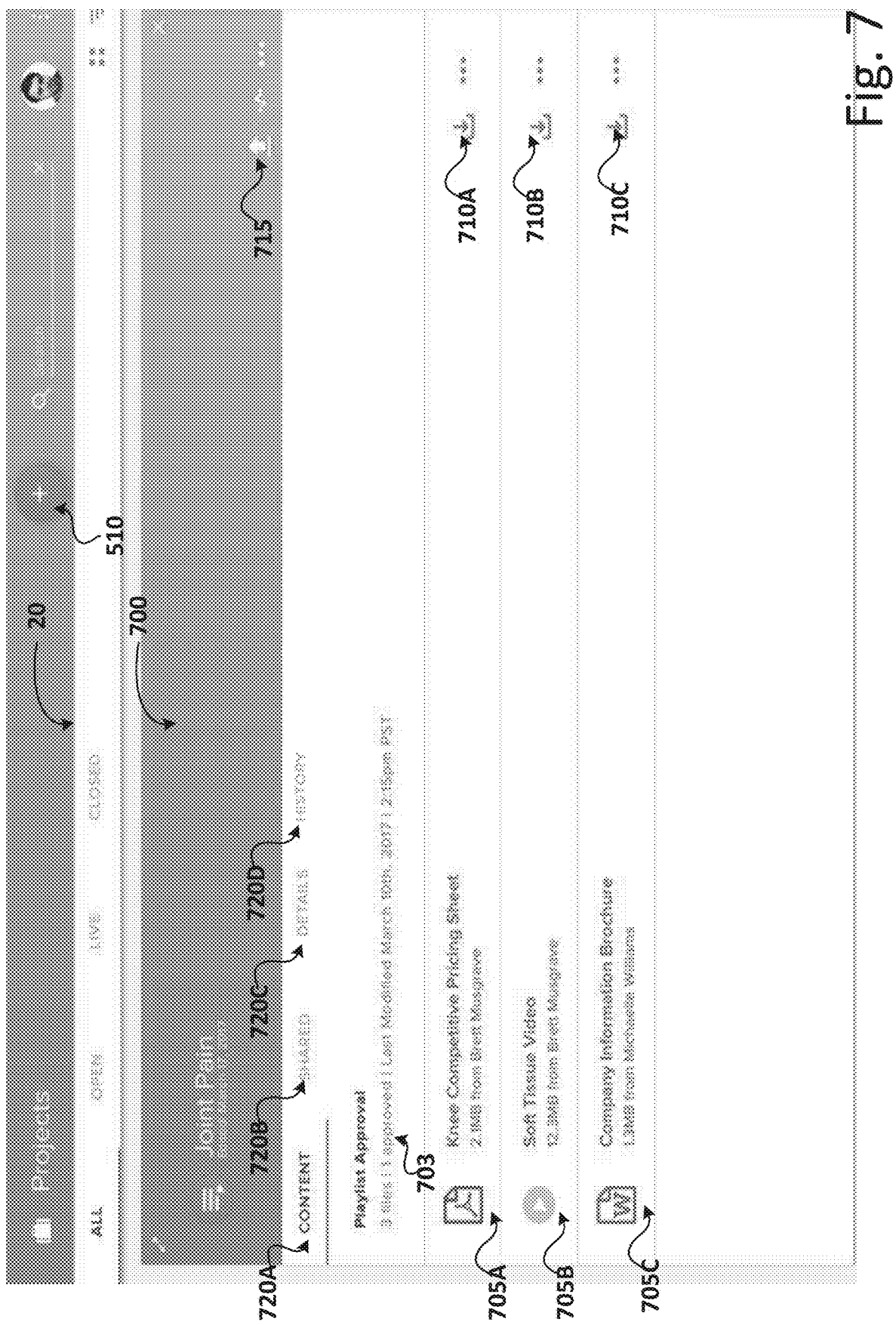

FIG. 7 illustrates an example instance 700 of the GUI 20 for viewing content items of a PRCP in accordance with various embodiments. In FIG. 7, like numbered items are the same as those described with respect to FIGS. 5-6. The GUI instance 700 may be generated in response to selecting the GCE 505B as shown by FIG. 5. As shown by FIG. 7, the instance 700 may include approval indication 703, GCEs 705A-C (collectively referred to as "GCEs 705" or "GCE 705"), GCEs 710A-C (collectively referred to as "GCEs 710" or "GCE 710"), a GCE 715, and GCEs 720A-D (collectively referred to as "GCEs 720" or "GCE 720"). The approval indication 703 may indicate a number of content items of the PRCP that have been approved (for example, "1 approved") and a date and/or time the PRCP was edited (for example, "Last Modified Mar. 10, 2017|2:15 pm PST") either by the representative device 105 and/or one or more reviewer devices 110.

Each of the GCEs 705 may be associated with a corresponding content item of the PRCP, and each of the GCEs 705 may include an icon or other like indication of a content type and/or format of the content item. For example, GCE 705A may be associated with the text-based content item titled "Knee Competitive Pricing Sheet" and an icon of the GCE 705A may indicate that the content item is a PDF file; GCE 705B may be associated with the video content item titled "Soft Tissue Video" and an icon of the GCE 705B may indicate that the content item is a video file; and GCE 705C may be associated with the text-based content item titled "Company Information Brochure" and an icon of the GCE 705C may indicate that the content item is a Microsoft® Word® document. The GCEs 705 may, when selected by clicking/tapping the GCEs 705, may generate another instance of the GUI (not shown) for viewing the corresponding content item. In one example, by selecting GCE 705A, the cloud 140 may provide a webpage or other like interface within the GUI 20 embedded with the "Knee Competitive Pricing Sheet" content item. In another example, by selecting GCE 705B, the cloud 140 may provide a webpage or other like interface within the GUI 20 including a media player to play the "Soft Tissue Video" content item.

The GCEs 710 may be buttons or other like GCEs that allow the user of the representative device to download the corresponding content item to the representative device. When a GCE 710 is selected, the representative device 105 may generate another instance of the GUI (not shown) comprising a download manager/component to provide functionality to store the corresponding content item to a desired memory/storage location.

The GCE 715 may be a button or other like GCE that allows the user of the representative device 105 to submit the PRCP for review. When the GCE 715 is selected, the representative device 105 may generate and send an electronic message including a submission instruction and/or other like parameters (for example, parameters 10 of message M1 of FIG. 1). In some embodiments, upon selection of the GCE 715, the representative device 105 may generate another instance of the GUI (not shown), which may allow the user of the representative device 105 to indicate various submission criteria/parameters, such as individual reviewer IDs, which correspond to the users that are to review the PRCP via their reviewer devices 110.

The GCEs 720 may be buttons or other like GCEs that allow the user of the representative device to switch a view of the GUI 20 and/or generate an instance of the GUI 20. For example, selection of the GCE 720A (for example, "Content" in FIG. 7) may generate and render the instance 700, which is the current view of the GUI 20 shown by FIG. 7; selection of the GCE 720B (for example, "Shared" in FIG. 7) may generate and render an instance showing other users that may view the content items of the PRCP, such as representatives that are collaborating on the PRCP; selection of the GCE 720C (for example, "Details" in FIG. 7) may generate and render an instance showing various PRCP criteria or parameters, such as an owner/author of the PRCP, data and/or time that the PRCP was modified; date and/or time that the PRCP was created; a file size of the PRCP; number of files in the PRCP, tags associated with the PRCP, references linked to the PRCP, and/or other like criteria/parameters; and selection of the GCE 720D (for example, "History" in FIG. 7) may generate and render an instance (for example, instance 900 shown by FIG. 9) showing various users that may review the PRCP for compliance with regulations and approve of the PRCP for distribution. Additionally, the GCE 720 of the current GUI 20 view or the currently viewed instance may be visually distinguished from the other GCEs 720. For example, as shown by FIG. 7, the GCE 720A is shown with a colored bottom border and bold text while the GCEs 720B-C are greyed out. In other embodiments, greying out or otherwise visually distinguishing the GCEs 720 may indicate that those GCEs 720 are inactive.

Figure 8:
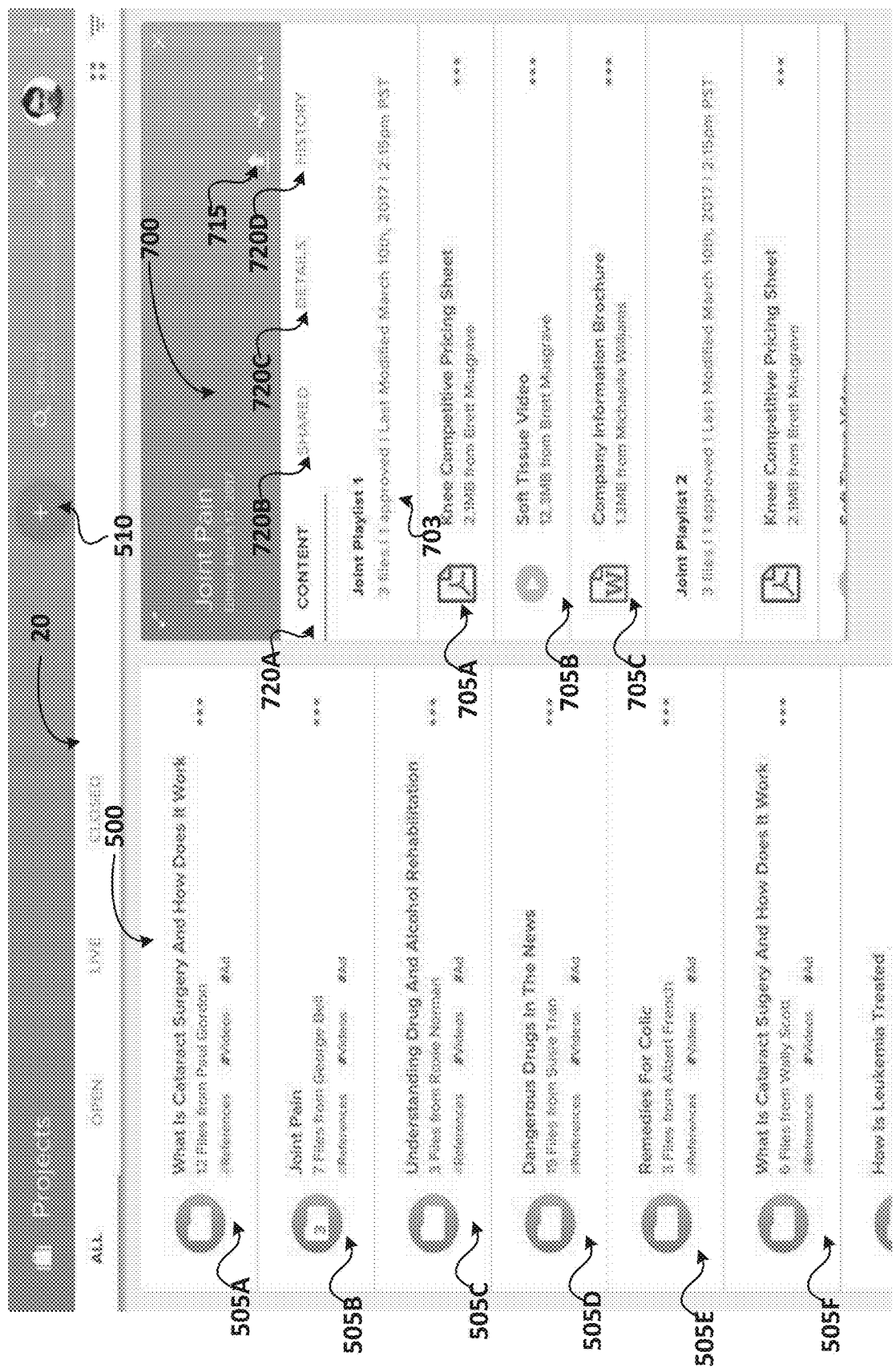

FIG. 8 illustrates an example view of the GUI 20 in accordance with various embodiments. The view of GUI 20 shown by FIG. 8 includes the instance 500 of FIG. 5 and the instance 700 of FIG. 7 side-by-side where like numbered items are the same as those described with respect to FIGS. 5 and 7. Additionally, in FIG. 8, instance 700 shows multiple playlists as belonging to the PRCP "Joint Pain". In embodiments, the individual playlists may include different content items or different versions of the same content items than other playlists in the PRCP, and individual playlists may be distributed to different recipient devices 115 based on various recipient criteria discussed previously.

Figure 9:
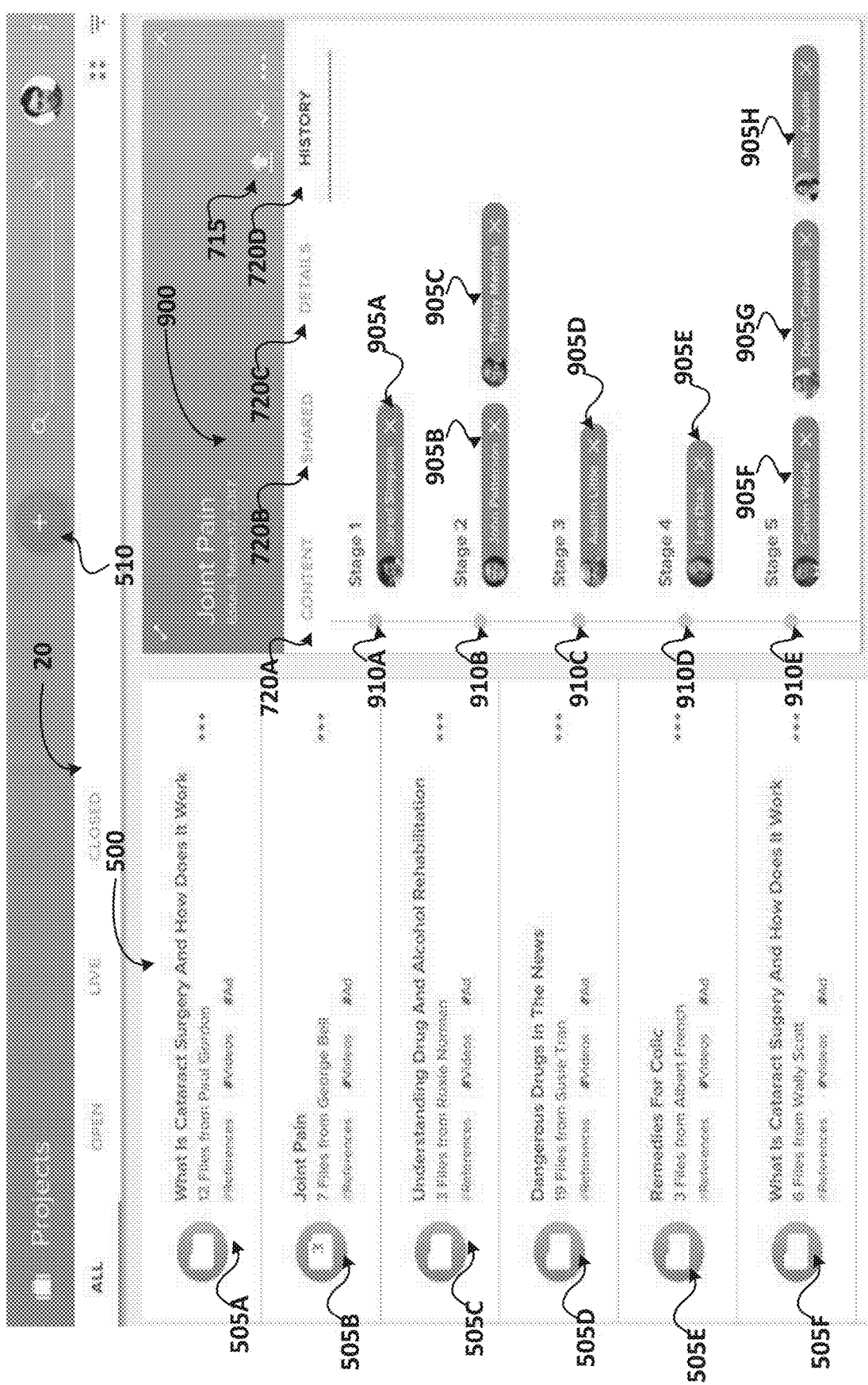

FIG. 9 illustrates an example instance 900 of the GUI 20 for viewing content items of a PRCP in accordance with various embodiments. In FIG. 9, like numbered items are the same as those described with respect to FIGS. 5-8. The view of GUI 20 shown by FIG. 9 includes the instance 500 of FIG. 5 and the instance 900 side-by-side where like numbered items are the same as those described with respect to FIGS. 5 and 7. The GUI instance 900 may be generated in response to selecting the GCE 720D, which is visually distinguished from the other GCEs 720 as discussed previously. As shown by FIG. 9, the GUI instance 900 may include reviewer icons 905A-H (collectively referred to as "reviewer icons 905" and the like) and anchors 910A-E (collectively referred to as "anchors 910" and the like).

Each of the reviewer icons 910 may be a graphical object, GCE, etc. that represents a corresponding reviewer, reviewer ID, or reviewer device 110 discussed previously. The "X" portion in each reviewer icon 905 may allow the user of the representative device to remove the reviewer icon 905 from the instance 900. Each of the anchors 910 may be a GCE that represents a particular reviewing or approval stage (for example, stages 1-5 in FIG. 9) to which a selected reviewer icon 905 can be attached. Each of the stages shown by FIG. 9 may represent different levels or phase of an approval process for approving the PRCP. According to some embodiments, upon selection of an anchor 905 by the user of the representative device 105, the anchor 905 may allow the user to input a reviewer name, reviewer ID, etc.

In one example, each of the anchors 910 may comprise a text box that allows the user to type in the reviewer name, reviewer ID, etc., where upon selection of the reviewer name, reviewer ID, etc., the representative device 105 may generate the corresponding reviewer icon 905. In another example, each of the anchors 910 may comprise a drop-down list or scrollable list that allows a user to select listed reviewer names, reviewer IDs, etc., and upon selection of the reviewer name, reviewer ID, etc., the representative device 105 may generate the corresponding reviewer icon 905. In another example, the user may perform a drag-and-drop operation by dragging a reviewer icon 905 from a contacts list (not shown) and dropping the contact onto a desired anchor 910. In each of the aforementioned examples, the reviewer icons 905 that appear when the reviewer name, reviewer ID, etc. is input may be based on an authority, clearance, or permission level of the reviewers such that each stage may be populated with reviewers that have the same or similar authority, clearance, or permission levels.

Figure 10:
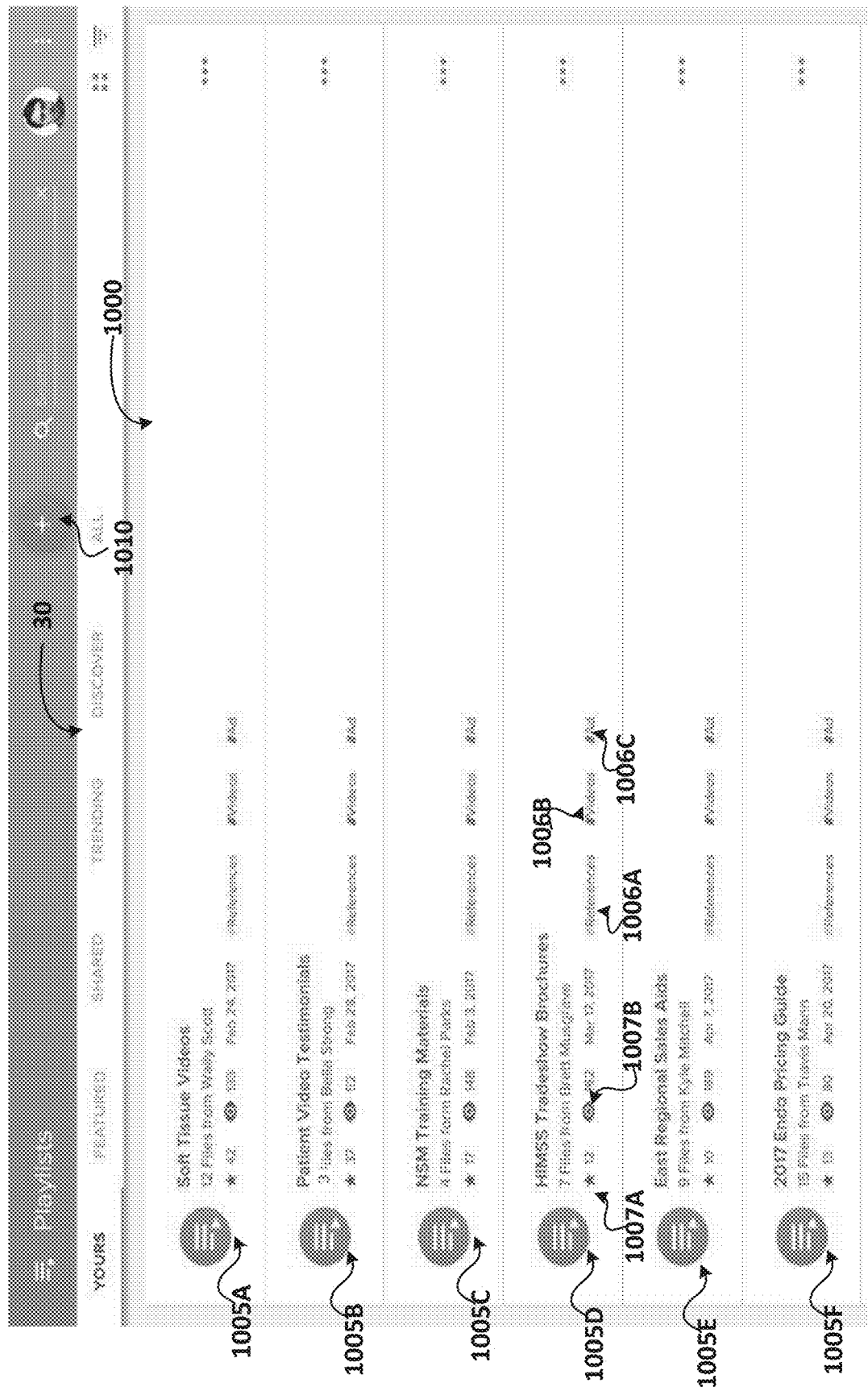
FIGS. 10-17 illustrate example interfaces for distributing a regulated content playlist, in accordance with various embodiments.

FIGS. 10-17 illustrate example interfaces for distributing a regulated content playlist, in accordance with various embodiments. At FIG. 10, an example instance 1000 of a GUI 30 shows a listing of ARCPs (referred to as "playlists" in FIGS. 10-17). The instance 1000 of the GUI 30 shown by FIG. 10 may occur as a result of selecting the GCE 715 (discussed with regard to FIG. 7) and subsequent approval of the RCPs shown by FIG. 10. As illustrated, the GUI instance 1000 may include GCEs 1005A-F and a GCE 1010. Each of the GCEs 1005A-F may be associated with a corresponding ARCP. For example, as shown by FIG. 10, GCE 1005D may be associated with an ARCP titled "HIMSS Tradeshow Brochures". The title of the ARCP may indicate a subject, topic, scenario, etc. of the ARCP, which may be used as a basis for controlling distribution of the ARCP to recipient devices 115. The GCE 1005D also lists an author or creator of the PRCP (for example, "Brett Musgrave") and also indicates a number of individual content items included in the ARCP (for example, "7 Files"). GCEs 1005A-F also indicate various tags associated with the ARPS. For example, GCE 1005D indicates tags 1006A-C, where tag 1006A indicates that reference items are included in the PRCP (for example, "# References"), tag 1006B indicates that video content items are included in the PRCP (for example, "# Videos"), and tag 1006C indicates that the PRCP includes content items that may be classified as advertisements (for example, "# Ad"). Other tags may be indicated by the GCEs 1005A-F.

The GCEs A-F also include a views indicator to indicate a number of recipient devices 115 that have viewed the ARCP, and a preference indicator to indicate a number of recipient devices 115 that have selected, saved, or liked the ARCP. For example, GCE 1005D indicates views indicator 1007A, which shows that the "HIMSS Tradeshow Brochure" has been viewed by 162 recipient devices 115; and indicates preference indicator 1007B, which shows that the "HIMSS Tradeshow Brochure" has been "liked", "stared", or otherwise favored by 12 recipient devices 115. GCE 1010 may, when selected by clicking (for example, using a mouse-cursor interface) or tapping (for example, using a touchscreen interface), generate an instance 1100 of the GUI for creating a new playlist, which is shown by FIG. 11.

Figure 11:
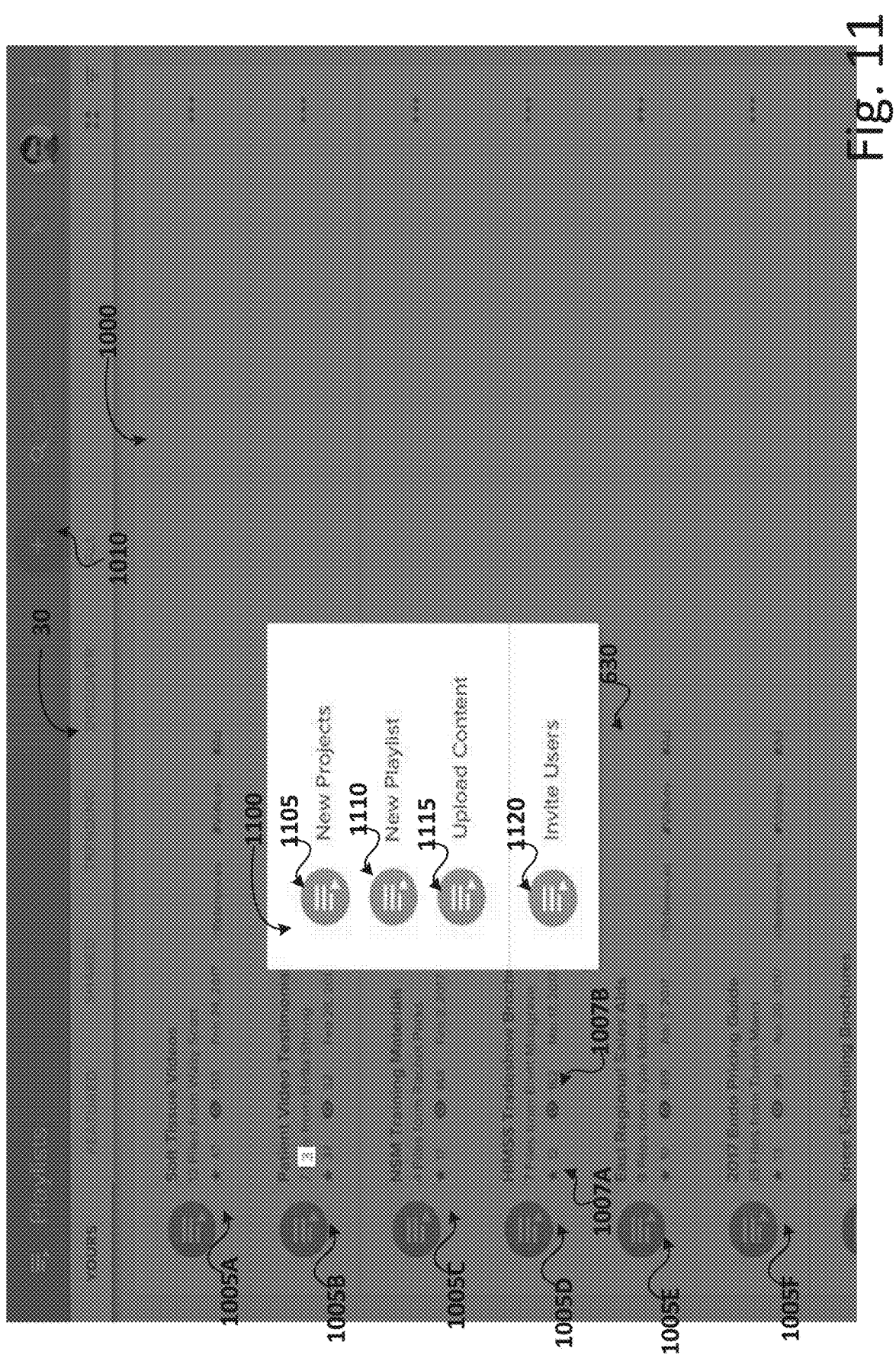

FIG. 11 illustrates an example instance 1100 of the GUI 30 for creating a new RCP, in accordance with various embodiments. In FIG. 11, like numbered items are the same as those described with respect to FIG. 10. As shown by FIG. 11, the GUI instance 1100 may be an interface superimposed or overlaid on top of the GUI instance 1000 of FIG. 10. The GUI instance 1100 may include GCEs 1105-1120, which allow a user of representative device 105 to create a new RCP or PRCP. For example, selection of the GCE 1105 may generate and render the instance 500 of GUI 20 shown and described with regards to FIG. 5; selection of the GCE 1110 may generate and render an instance of GUI 30 that allows the user to create a new ARCP from pre-approved content items and/or by rearranging content items of existing ARCPs; selection of the GCE 1115 may cause the representative device 105 to generate another instance of the GUI 30 (not shown) comprising an upload component to provide functionality to select and add individual content items for inclusion in an ARCP and/or a PRCP; and selection of the GCE 1120 may cause the representative device 105 to generate another instance of the GUI 30 (not shown) that allows the user to send invitation message to one or more recipient devices 115 to view content items of one or more ARCPs.

Figure 12:
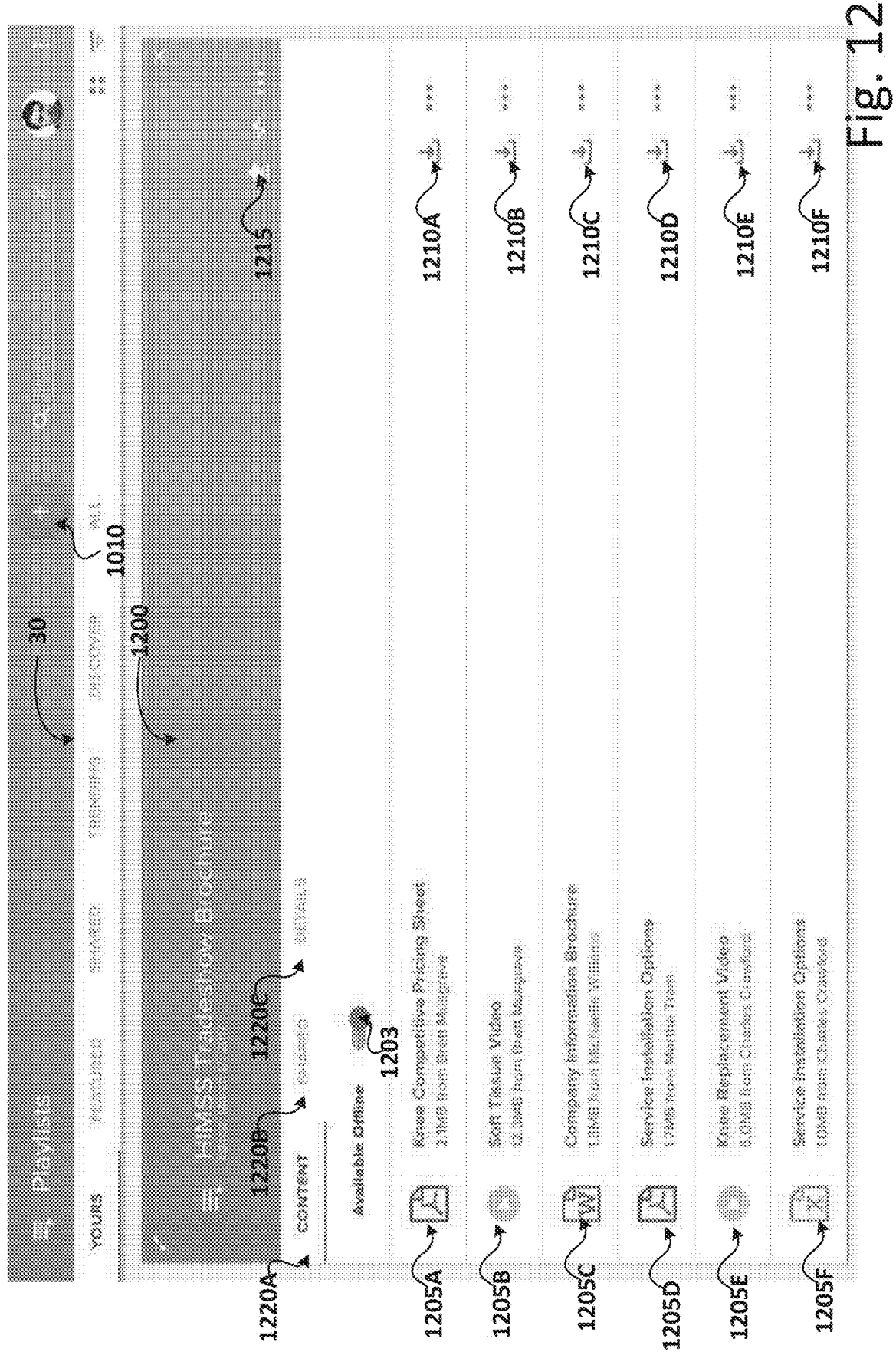

FIG. 12 illustrates an example instance 1200 of the GUI 30 for viewing content items of an ARCP in accordance with various embodiments. In FIG. 12, like numbered items are the same as those described with respect to FIGS. 10-11. The GUI instance 1200 may be generated in response to selecting the GCE 1005D as shown by FIG. 10. As shown by FIG. 12, the GUI instance 1200 may include GCE 1203, GCEs 1205A-F, GCEs 1210A-F, a GCE 1215, and GCEs 1220A-C. The GCE 1203 may allow the user of the representative device 105 to indicate whether recipient devices 115 may access the content items of the ARCP offline or download and store the content items locally at the recipient devices 115. In the example shown by FIG. 12, the GCE 1203 may be a slider, where the user of representative device 105 may allow offline access to the content items by moving the slider along its sliding scale to a desired value. As shown by FIG. 12, the selected value is shown as enabled, which means that recipient devices 115 may download and locally store the content items of the ARCP.

Each of the GCEs 1205A-F may be associated with a corresponding content item of the ARCP, and each of the GCEs 1205A-F may include an icon or other like indication of a content type and/or format of the content item. For example, GCE 1205A may be associated with the text-based content item titled "Knee Competitive Pricing Sheet" and an icon of the GCE 1205A may indicate that the content item is a PDF file; GCE 1205B may be associated with the video content item titled "Soft Tissue Video" and an icon of the GCE 1205B may indicate that the content item is a video file; GCE 1205C may be associated with the text-based content item titled "Company Information Brochure" and an icon of the GCE 1205C may indicate that the content item is a Microsoft® Word® document; GCE 1205D may be associated with the text-based content item titled "Service Installation Options" and an icon of the GCE 1205D may indicate that the content item is a PDF file; GCE 1205E may be associated with the video content item titled "Knee Replacement Video" and an icon of the GCE 1205E may indicate that the content item is a video file; GCE 1205F may be associated with the text-based content item titled "Service Installation Options" and an icon of the GCE 1205F may indicate that the content item is a Microsoft® Excel® file. The GCEs 1205A-F, when selected by clicking/tapping the GCEs 1205A-C, may generate another instance of the GUI (not shown) for viewing the corresponding content item. In one example, by selecting GCE 1205A, the cloud 140 may provide a webpage or other like interface within the GUI 30 embedded with the "Knee Competitive Pricing Sheet" content item. In another example, by selecting GCE 1205B, the cloud 140 may provide a webpage or other like interface within the GUI 30 including a media player to play the "Soft Tissue Video" content item.

The GCEs 1210A-F may be buttons or other like GCEs that allow the user of the representative device to download the corresponding content item to the representative device 105. When a GCE 1210A-F is selected, the representative device 105 may generate another instance of the GUI (not shown) comprising a download manager/component to provide functionality to store the corresponding content item to a desired memory/storage location.

The GCE 1215 may be a button or other like GCE that allows the user of the representative device 105 to distribute the ARCP to one or more recipient device 115. When the GCE 1215 is selected, the representative device 105 may generate and send an electronic message including a distribution instruction and/or other like parameters (for example, message M5 including distribution parameters 13 of FIG. 1). In some embodiments, upon selection of the GCE 1215, the representative device 105 may generate another instance of the GUI (not shown), which may allow the user of the representative device 105 to indicate various distribution criteria/parameters, such as individual recipient IDs, which correspond to the users that should be invited to access the ARCP using their recipient devices 115.

The GCEs 1220A-C may be buttons or other like GCEs that allow the user of the representative device to switch a view of the GUI 30 and/or generate an instance of the GUI 30. For example, selection of the GCE 1220A (for example, "Content" in FIG. 12) may generate and render the instance 700, which is the current view of the GUI 30 shown by FIG. 12; selection of the GCE 1220B (for example, "Shared" in FIG. 12) may generate and render an instance showing users of recipient devices 115 that may access the content items of the ARCP; and selection of the GCE 1220C (for example, "Details" in FIG. 12) may generate and render an instance showing various ARCP criteria or parameters (see for example, FIG. 14). Additionally, the GCE 1220 of the current GUI 30 view or the currently viewed instance may be visually distinguished from the other GCEs 1220. For example, as shown by FIG. 12, the GCE 1220A is shown with a colored bottom border and bold text while the GCEs 1220B-C are greyed out. In other embodiments, greying out or otherwise visually distinguishing the GCEs 1220 may indicate that those GCEs 1220 are inactive.

Figure 13:
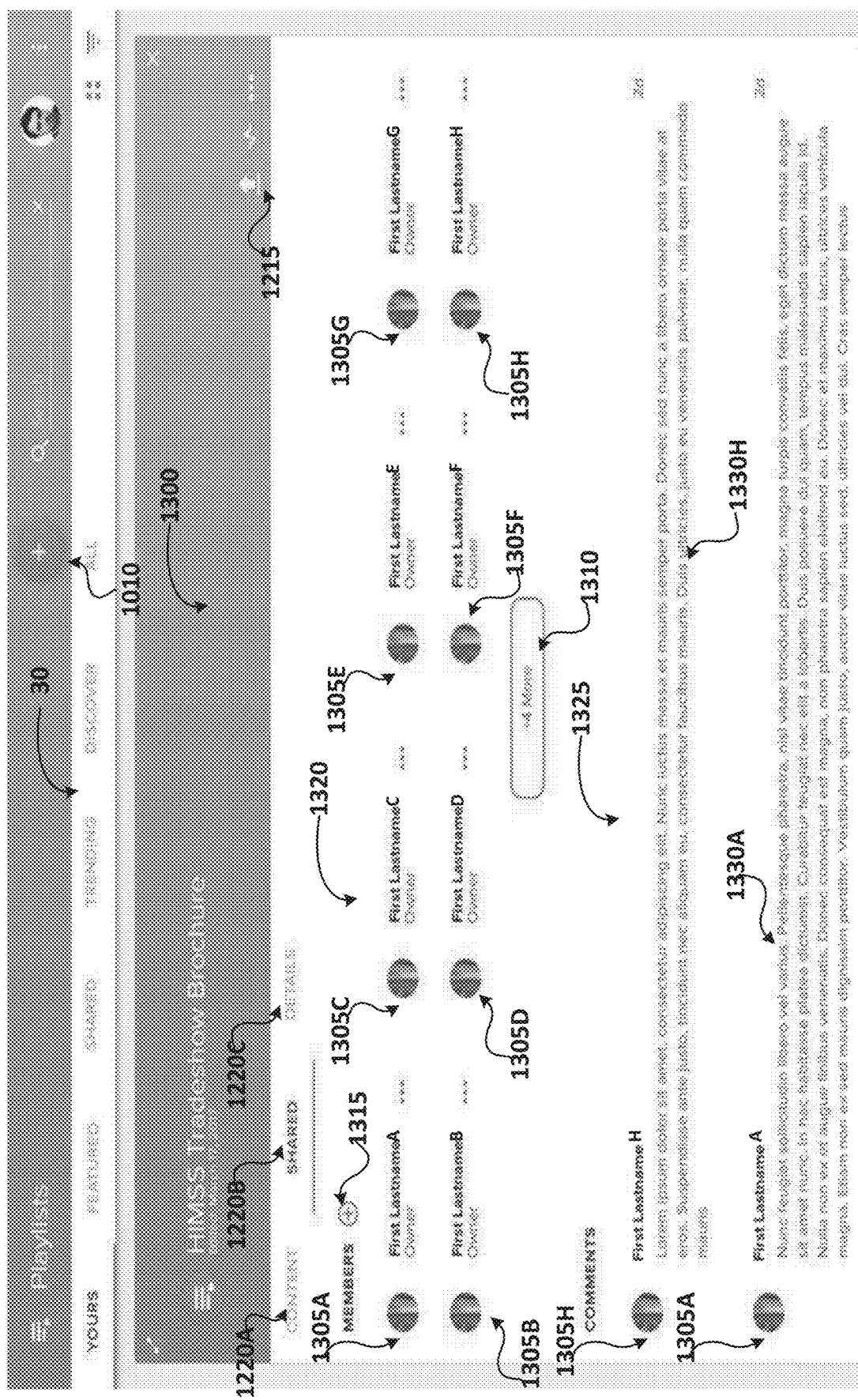

FIG. 13 illustrates an example instance 1300 of the GUI 30 for viewing recipients permitted to access the ARCP, in accordance with various embodiments. In FIG. 13, like numbered items are the same as those described with respect to FIGS. 10-12. The instance 1300 may be generated in response to selecting the GCE 1005D as shown by FIG. 10 and selecting the GCE 1220B as shown and described with regard to FIG. 12. As shown by FIG. 13, the GUI instance 1300 may include recipient icons 1305A-H (collectively referred to as "recipient icons 1305"), a members section 1320 including a GCE 1310 and GCE 1315, and comments section 1315.

The members section 1320 may be a section, region, or area of the instance 1300 that shows the recipients that are permitted to access the ARCP "HIMSS Tradeshow Brochure". Each of the recipient icons 1305 in the members section 1320 may be a graphical object, GCE, etc. that represents a corresponding recipient user, recipient ID, or recipient device 115 discussed previously. The GCE 1310 may, upon selection, expand the members section 1320 to show additional recipients that may access the ARCP. The GCE 1315 may allow the user of the representative device 105 to invite additional recipients to access the ARCP. Selection of the GCE 1315 may cause the representative device 105 to generate and send an electronic message including a distribution instruction and/or other like parameters (for example, message M5 including distribution parameters 13 of FIG. 1) to one or more selected recipients.

The comments section 1325 may be a section, region, or area of the instance 1300 that shows comments 1330 made to the ARCP by recipients. For example, as shown by FIG. 13, the comments section 1325 may include comments 1330H made by recipient "First LastnameH", which is represented by the recipient icon 1305H; and comments 1330A made by recipient "First LastnameA", which is represented by the recipient icon 1305A.

Figure 14:
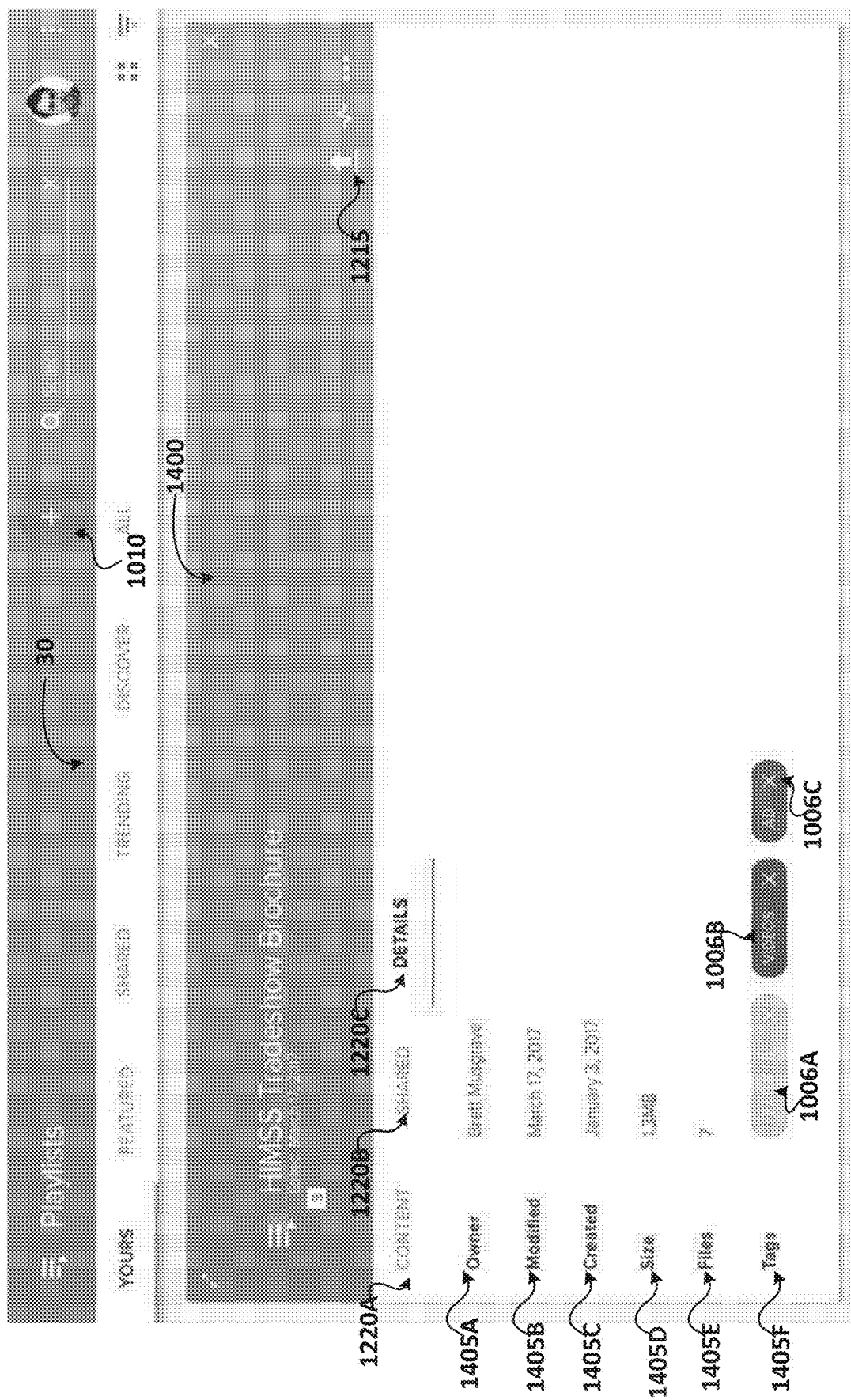

FIG. 14 illustrates an example instance 1400 of the GUI 30 for viewing RCP parameters, in accordance with various embodiments. In FIG. 14, like numbered items are the same as those described with respect to FIGS. 10-13. The instance 1400 may be generated in response to selecting the GCE 1005D as shown by FIG. 10 and selecting the GCE 1220C as shown and described with regard to FIG. 12. As shown by FIG. 14, the instance 1400 may include field icons 1405A-F (collectively referred to as "field icons 1405"). Each of the field icons 1405 may be a graphical object, GCE, etc. that represents a corresponding field in the RCP entity 106 as discussed previously. As shown by FIG. 14, the field icon 1405A may indicate an owner or author of the ARCP (for example, "Brett Musgrave" in FIG. 14); the field icon 1405B may indicate date the ARCP was last modified (for example, "Mar. 17, 2017" in FIG. 14); the field icon 1405C may a creation date of the ARCP (for example, "Jan. 3, 2017" in FIG. 14); the field icon 1405D may indicate a size of the ARCP (for example, "1.3 MB" in FIG. 14), which may be a total size of all of the content items in the ARCP; the field icon 1405E may indicate a number of files in the ARCP (for example, "7" in FIG. 14); and the field icon 1405F may indicate the tags 1006 associated with the ARCP (for example, tags 1006A-C discussed with regard to FIG. 10). In other embodiments, other fileds of the RCP entity 106 may be represented by field icons 1405 and shown by instance 1400.

Figure 15:
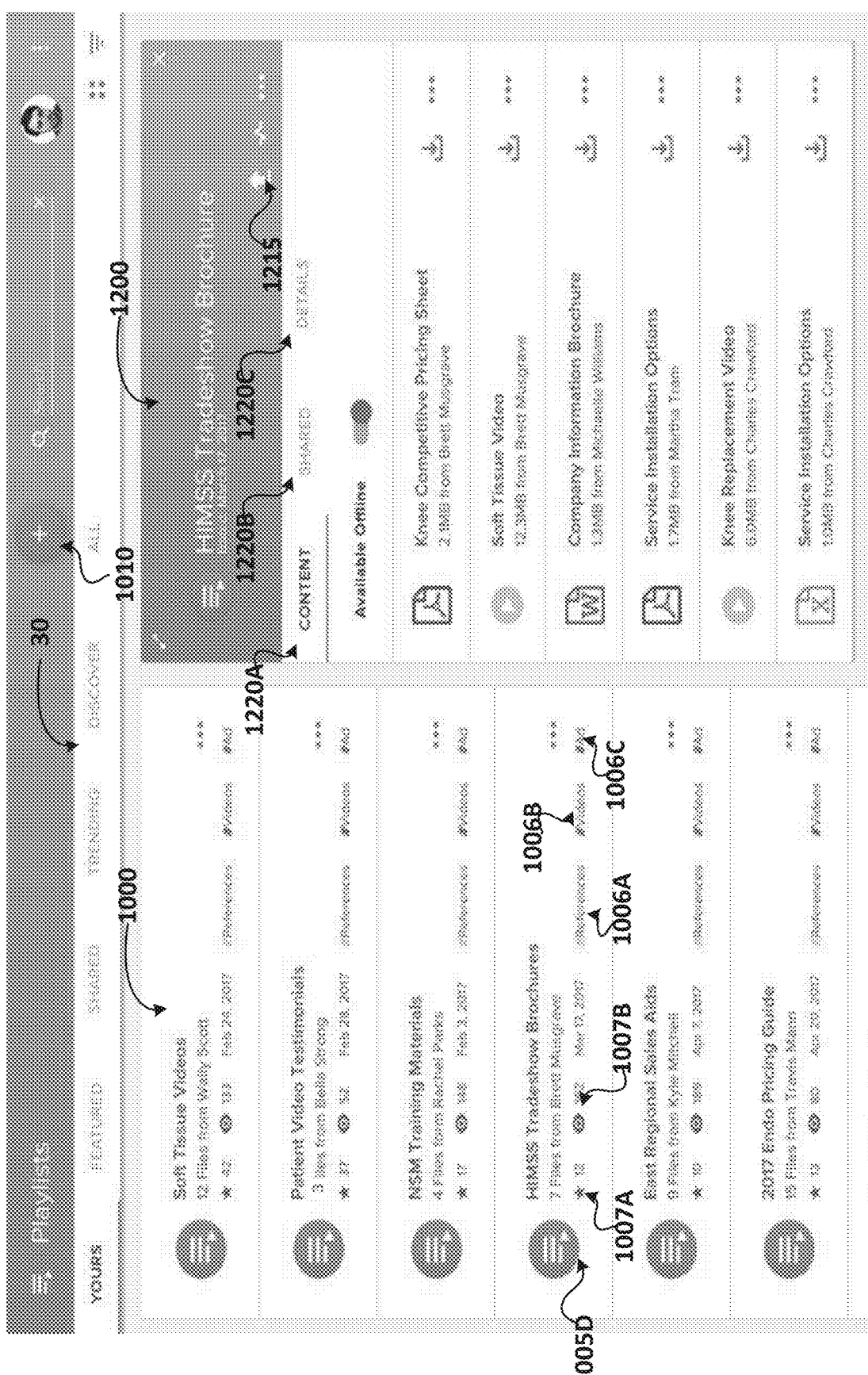
Figure 16:
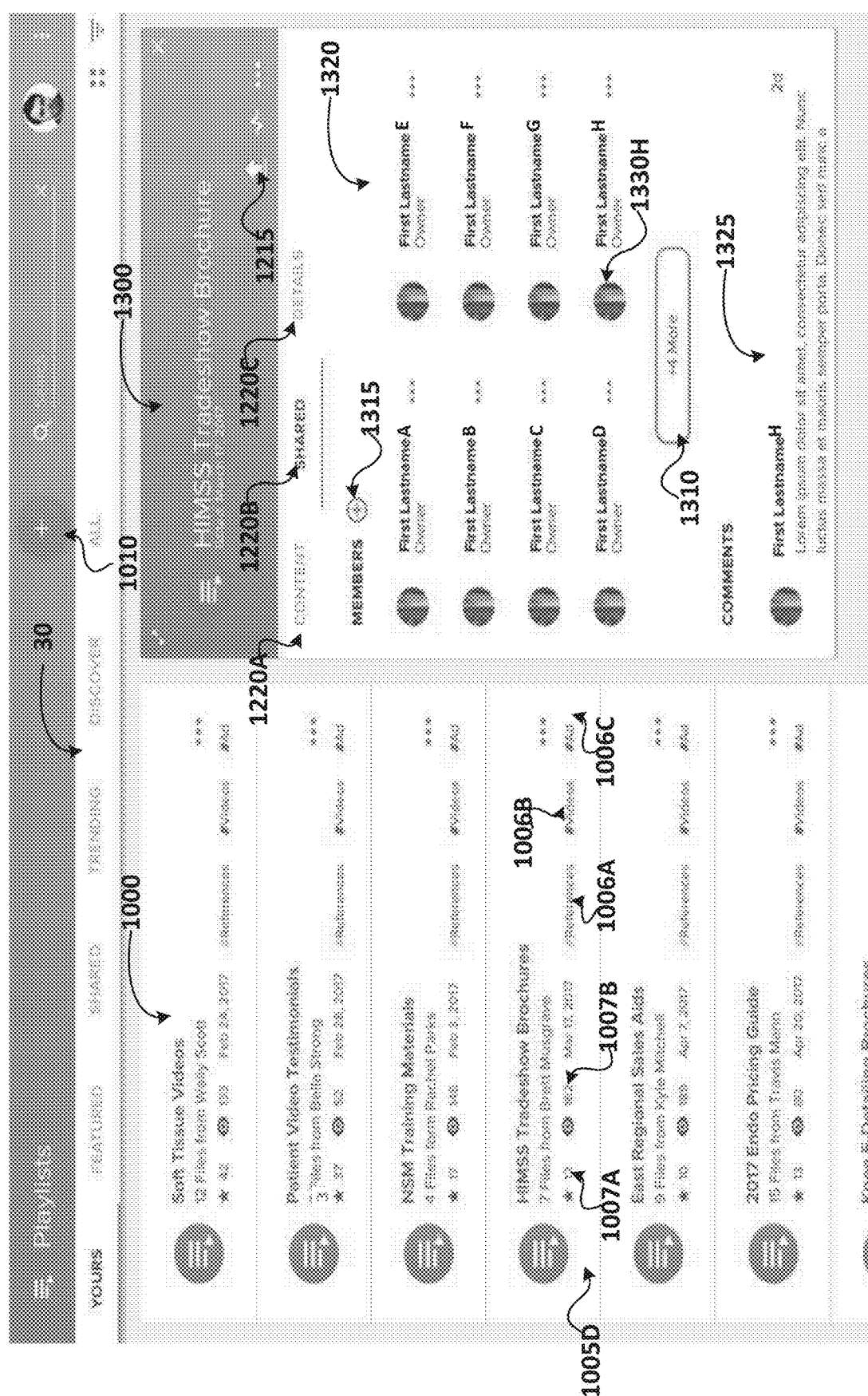
Figure 17:
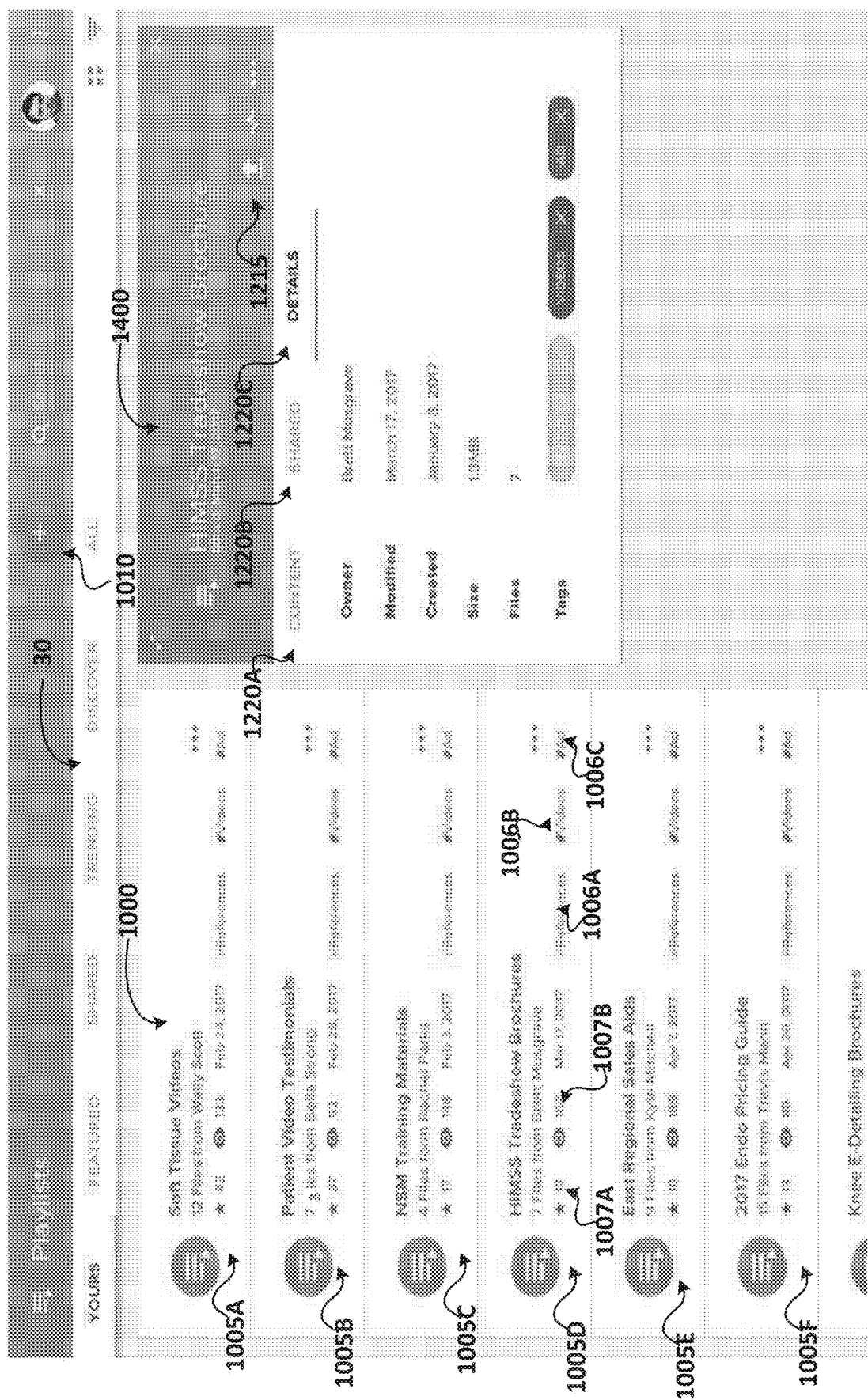

FIG. 15 illustrates an example view of the GUI 30 in accordance with various embodiments. The view of GUI 30 shown by FIG. 15 includes the instance 1000 of FIG. 5 and the instance 1200 of FIG. 12 side-by-side where like numbered items are the same as those described with respect to FIGS. 10 and 12. FIG. 16 illustrates an example view of the GUI 30 in accordance with various embodiments. The view of GUI 30 shown by FIG. 16 includes the instance 1000 of FIG. 5 and the instance 1300 of FIG. 13 side-by-side where like numbered items are the same as those described with respect to FIGS. 10, 12, and 13. FIG. 17 illustrates an example view of the GUI 30 in accordance with various embodiments. The view of GUI 30 shown by FIG. 17 includes the instance 1000 of FIG. 5 and the instance 1400 of FIG. 14 side-by-side where like numbered items are the same as those described with respect to FIGS. 10, 12-13, and 14. For clarity, some labels shown by FIGS. 10-14 have not been added to FIGS. 15-17.

Figure 18:
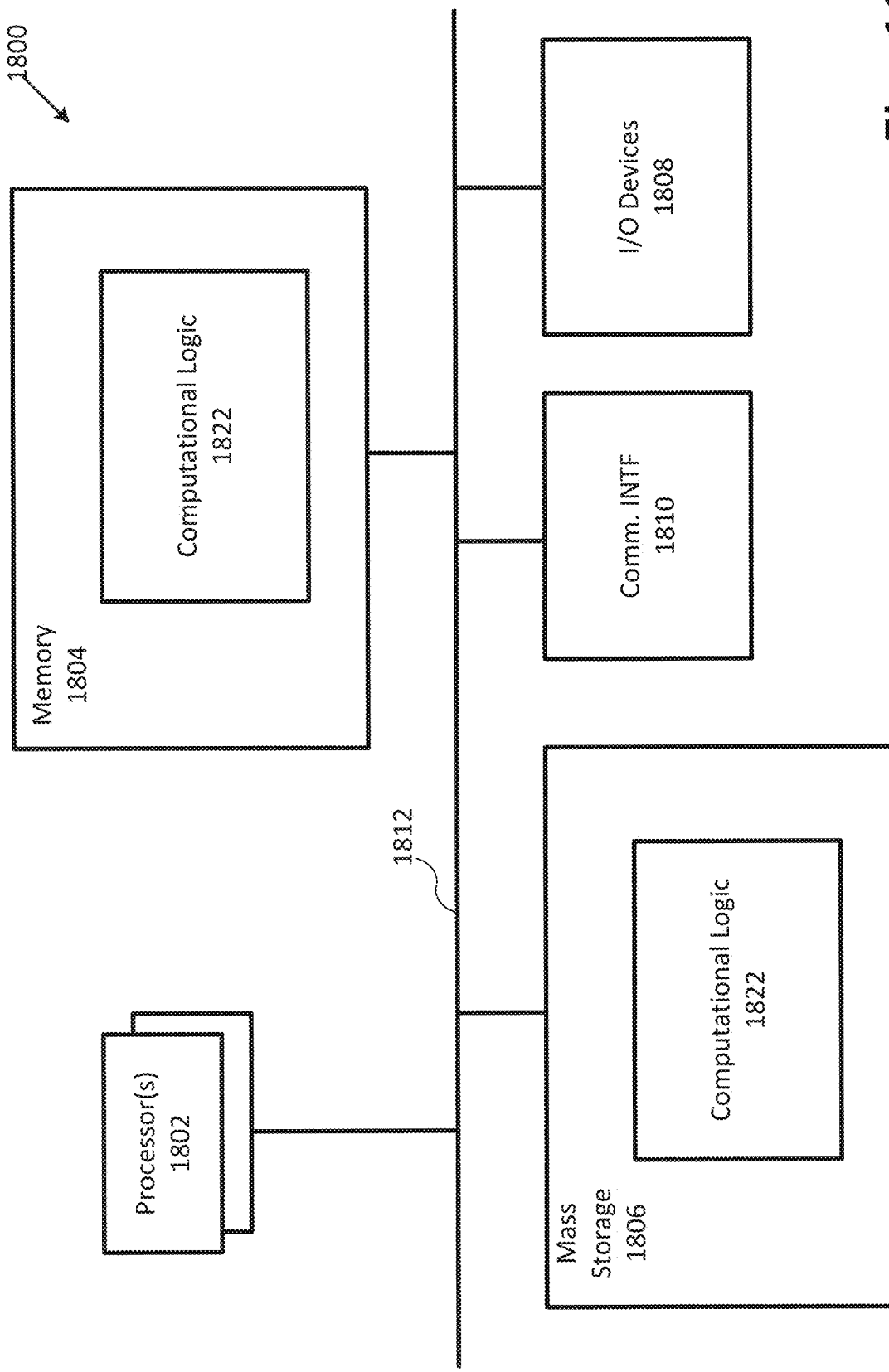
FIG. 18 illustrates an example computing environment suitable for practicing various aspects of the present disclosure in accordance with various embodiments.

Referring now to FIG. 18, an example computer suitable for practicing various aspects of the present disclosure, including processes described herein, is illustrated in accordance with various embodiments. In various embodiments, the computer 1800 shown by FIG. 18 may be implemented as the client devices 105, 110, 115 and/or the servers 145 shown and described with respect to FIG. 1.

As shown, computer 1800 may include one or more processors or processor cores 1802, and system memory 1904. For the purpose of this application, including the claims, the terms "processor" and "processor cores" may be considered synonymous, unless the context clearly requires otherwise. Additionally, computer 1800 may include mass storage devices 1806 (such as diskette, hard drive, flash drive, solid state drive, compact disc read only memory (CD-ROM) and so forth), input/output devices 1808 (such as display, keyboard, cursor control, remote control, gaming controller, image capture device, and so forth) and communication interfaces 1810. The elements may be coupled to each other via system bus 1812, which may represent one or more buses. In the case of multiple buses, they may be bridged by one or more bus bridges (not shown). Elements such as mass storage may be physically separate or remote.

The communication interfaces 1810 may be one or more hardware devices that allow the computer 1800 to communicate with other devices. In embodiments, each of the communication interfaces 1810 may include one or more processors (for example, baseband processors, etc.) that are dedicated to a particular wireless communication protocol (for example, Wi-Fi and/or IEEE 802.11 protocols), a cellular communication protocol (for example, Long Term Evolution (LTE) and the like), a wireless personal area network (WPAN) protocol (for example, IEEE 802.15.4-802.15.5 protocols, Bluetooth or Bluetooth low energy (BLE), etc.), and/or a wired communication protocol (for example, Ethernet, Fiber Distributed Data Interface (FDDI), Point-to-Point (PPP), etc.). The communication interfaces 1810 may also include hardware devices that enable communication with wireless/wired networks and/or other computing devices using modulated electromagnetic radiation through a solid or non-solid medium. Such hardware devices may include switches, filters, amplifiers, antenna elements, receptacles/ports to accept plugs/connectors, and/or and the like to facilitate the communications over the air or through a wire by generating or otherwise producing radio waves to transmit data to one or more other devices, and converting received signals into usable information, such as digital data, which may be provided to one or more other components of computer 1800.

Each of these elements may perform its conventional functions known in the art. In particular, system memory 1904 and mass storage devices 1806 may be employed to store a working copy and a permanent copy of the programming instructions implementing the operations associated with facilitation of communication with selected specialists as shown in processes described herein. The various elements may be implemented by assembler instructions supported by processor(s) 1802 or high-level languages, such as, for example, C and/or any of the other high-level languages discussed herein, that can be compiled into such instructions.

The permanent copy of the programming instructions may be placed into permanent storage devices 1806 in the factory, or in the field, through, for example, a distribution medium (not shown), such as a compact disc (CD), or through communication interface 1810 (from a distribution server (not shown)). That is, one or more distribution media having an implementation of the processes described herein may be employed to distribute the programming instructions and program various computing devices.

The number, capability and/or capacity of these elements 1810-1812 may vary, depending on how computer 1800 is used. Their constitutions are otherwise known, and accordingly will not be further described.

Figure 19:
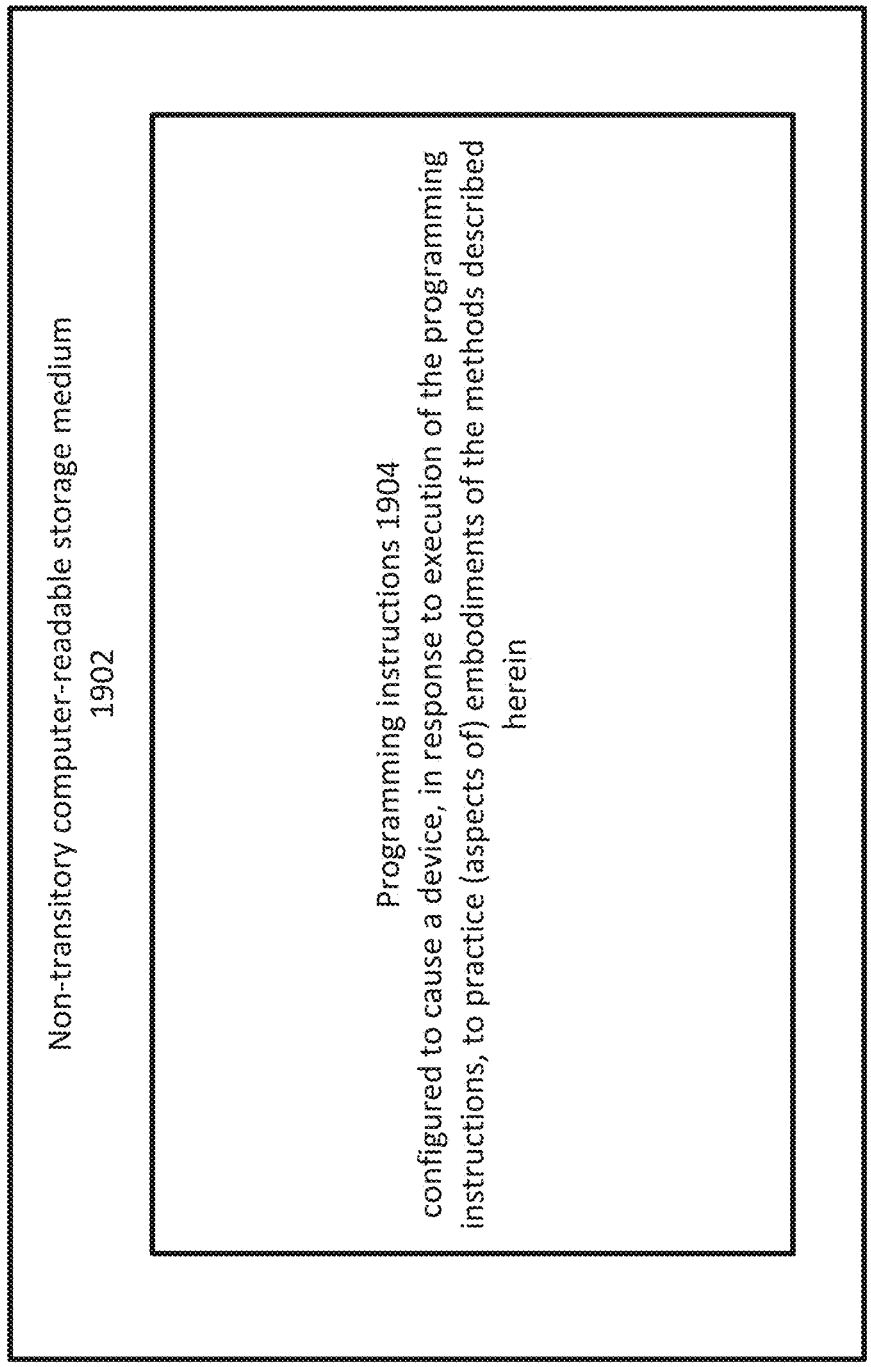
FIG. 19 illustrates an example storage medium with instructions configured to enable an apparatus to practice various aspects of the present disclosure in accordance with various embodiments.

FIG. 19 illustrates an example least one computer-readable storage medium 1902 having instructions configured to practice all or selected ones of the operations associated with techniques described herein. As illustrated, least one computer-readable storage medium 1902 may include a number of programming instructions 1904. Programming instructions 1904 may be configured to enable a device, for example, computer 1800, in response to execution of the programming instructions, to perform, for example, various operations of processes described herein, but not limited to, to the various operations performed to modify and share content. In alternate embodiments, programming instructions 1904 may be disposed on multiple computer-readable storage media 1902 instead.

Referring back to FIG. 18, for one embodiment, at least one of processors 1802 may be packaged together with computational logic 1822 configured to practice aspects of processes described herein. For one embodiment, at least one of processors 1802 may be packaged together with computational logic 1822 configured to practice aspects of processes of described herein to form a System in Package (SiP). For one embodiment, at least one of processors 1802 may be integrated on the same die with computational logic 1822 configured to practice aspects of processes of described herein. For one embodiment, at least one of processors 1802 may be packaged together with computational logic 1822 configured to practice aspects of processes of described herein to form a System on Chip (SoC). For at least one embodiment, the SoC may be utilized in, for example, but not limited to, a computing tablet, smartphone, laptop computer device, and the like.

Computer-readable media (including least one computer-readable media), methods, apparatuses, systems and devices for performing the above-described techniques are illustrative examples of embodiments disclosed herein. Additionally, other devices in the above-described interactions may be configured to perform various disclosed techniques Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The invention claimed is:

1. A computer system to be employed in a cloud computing service, the computer system comprising: processor circuitry to:
generate, in response to receipt of a selection of a plurality of content items from a representative device, a proposed regulated content playlist (PRCP) to be populated with the plurality of content items,
identify receipt of a submission instruction from the representative device to submit the PRCP to be approved for distribution to one or more recipient devices different than the representative device, wherein the submission instruction is to cause the PRCP to be populated with the plurality of content items,
identify receipt of an approval indicator from a reviewer device different than the representative device and the one or more recipient devices, the approval indicator to indicate that at least one content item of the plurality of content items has been approved for distribution to the one or more recipient devices,
convert content items from the PRCP indicated by the approval indicator into an approved regulated content playlist (ARCP), the ARCP to exclude unapproved content items from the PRCP,
identify receipt of a distribution instruction from the representative device to distribute the ARCP to the one or more recipient devices,
determine respective permissions associated with individual recipient devices of the one or more recipient devices, the respective permissions indicating topics and content types of content items in the ARCP that the individual recipient devices are permitted to consume, and
prevent the individual recipient devices from accessing approved content items of the ARCP that have topics or content types that are not indicated by the respective permissions; and
network interface circuitry coupled with the processor circuitry, the network interface circuitry to:
establish, in response to receipt of the submission instruction, an end-to-end encrypted tunnel (EET) between the computer system and the reviewer device,
send an invitation to access the PRCP to the reviewer device via the EET, and
receive the approval indicator from the reviewer device via the EET.

2. The computer system of claim 1, wherein the network interface circuitry is to:
obtain individual content items of the plurality of content items to be added to the PRCP prior to identifying the submission instruction;
obtain the submission instruction; and
obtain, in response to sending the PRCP to the reviewer device, individual reviewer identifiers (IDs) corresponding to users that are to review the PRCP.

3. The computer system of claim 2, wherein:
the processor circuitry is to identify comments associated with the individual content items to be added to the PRCP, individual tags associated with the PRCP, individual links to individual reference items to be associated with the PRCP, and a requested due date for approval of the PRCP, and
the network interface circuitry is to send, to the reviewer device with the PRCP, the comments, the tags, the individual links, and the requested due date.

4. The computer system of claim 1, wherein:
the network interface circuitry is to receive, from the reviewer device through the EET, additional content associated with individual content items of the plurality of content items, wherein the additional content comprises reviewer comments on the associated individual content items or revised versions of the individual content items; and
the processor circuitry is to convert the PRCP into an updated PRCP including the additional content.

5. The computer system of claim 1, wherein the EET is a first EET, and wherein the network interface circuitry is to:
establish corresponding second EETs with the one or more recipient devices in response to the distribution instruction, and
send, to the one or more recipient devices over the corresponding second EETs, an invitation to access the ARCP.

6. The computer system of claim 5, wherein:
the network interface circuitry is to receive, from the individual recipient devices through the corresponding second EETs, a message including recipient comments on content items of the ARCP; and
the processor circuitry is to append the recipient comments to the ARCP in response to receipt of the message.

7. The computer system of claim 1, wherein at least one content item of the plurality of content items is a different content type than a content type of other content items of the plurality of content items.

8. One or more non-transitory computer-readable media (NTCRM) comprising instructions, wherein execution of the instructions by a representative device is to cause the representative device to:
generate a first instance of a graphical user interface (GUI), the first instance of the GUI comprising a first graphical control element (GCE) to control selection of individual content items of a plurality of content items for inclusion in a proposed regulated content playlist (PRCP), and a second GCE to control submission of the PRCP to a reviewer device to be approved for distribution to one or more recipient devices, the reviewer device different than the representative device and the one or more recipient devices; and
in response to selection of the second GCE,
request establishment of a first end-to-end encrypted tunnel (EET) between the representative device and a cloud computing system, the request indicates a new or existing regulated content playlist (RCP) entity to which the individual content items are to be added and the individual content items to be added to the RCP entity,
send, to the cloud computing system via the first EET, a submission instruction to instruct the cloud computing system to distribute the PRCP to the reviewer device for review,
receive, via the first EET, an approval indicator from the reviewer device,
convert content items from the PRCP indicated as being approved content items into an approved regulated content playlist (ARCP), the ARCP excluding unapproved content items from the PRCP, and
generate a second instance of the GUI, the second instance of the GUI comprising an indication of the approved content items in the ARCP and a third GCE to control submission of a distribution instruction; and
in response to selection of the third GCE,
send the distribution instruction to the cloud computing system via a second EET, the distribution instruction to instruct the cloud computing system to distribute the ARCP to the one or more recipient devices different than the representative device and the reviewer device,
wherein respective permissions associated with individual recipient devices of the one or more recipient devices indicate topics and content types of content items in the ARCP that the individual recipient devices are permitted to consume, and
wherein the individual recipient devices are prevented from accessing approved content items of the ARCP that have topics or content types that are not indicated by the respective permissions.

9. The one or more NTCRM of claim 8, wherein the PRCP comprises at least two content items, and at least one content item of the at least two content items has a different format than other content items of the at least two content items.

10. The one or more NTCRM of claim 8, wherein the second instance of the GUI comprises:
a fourth GCE to control generation of a third instance of the GUI, the third instance of the GUI comprising visual representations of individual content items of the PRCP; and
a fifth GCE to control generation of a fourth instance of the GUI, the fourth instance of the GUI comprising visual representations of one or more reviewers to review the PRCP.

11. The one or more NTCRM of claim 8, wherein the first instance of the GUI comprises:
a sixth GCE to enable input of text to be associated with individual content items, and
upon selection of the second GCE, the text to be associated with the individual content items is included with the PRCP and separate from the individual content items.

12. The one or more NTCRM of claim 8, wherein, upon selection of the first GCE, execution of the instructions is to cause the representative device to:
generate a fifth instance of the GUI comprising an upload component to provide functionality to select and add the individual content items for inclusion in the PRCP.

13. The one or more NTCRM of claim 8, wherein execution of the instructions is to cause the representative device to:
generate a sixth instance of the GUI comprising:
a seventh GCE to control application of individual tags to the PRCP;
an eighth GCE to control selection of individual links to individual reference items to be associated with the PRCP; and
a ninth GCE to control selection of a requested due date for approval of the PRCP.

14. The one or more NTCRM of claim 8, wherein execution of the instructions is to cause the representative device to:
generate a seventh instance of the GUI comprising:
a list of approved regulated content playlists (ARCPs), wherein the ARCPs comprise PRCPs with at least one approved content item, and
a tenth GCE to control distribution of a selected ARCP of the list of ARCPs to identified recipient devices.

15. The one or more NTCRM of claim 14, wherein, and in response to selection of the tenth GCE, execution of the instructions is to cause the representative device to:
request establishment of corresponding second EETs with the identified recipient devices; and
send, to the identified recipient devices over the corresponding second EETs, an invitation to access the selected ARCP, wherein unapproved content items of the selected ARCP are inaccessible by the identified recipient devices.

16. The one or more NTCRM of claim 8, wherein execution of the instructions is to cause the representative device to:
obtain, from an individual recipient device of the identified recipient devices, comments associated with distributed ARCP; and
generate an eighth instance of the GUI comprising the comments and a visual representation of a user of the individual recipient device.

17. A computer-implemented method of operating a reviewer device, the method comprising:
  obtaining, by the reviewer device from a representative device different than the reviewer device, an indication to review a proposed regulated content playlist (PRCP), the PRCP including a plurality of content items;
  establishing, by the reviewer device, an end-to-end encrypted tunnel (EET) with a cloud computing system;
  accessing, by the reviewer device over the EET, the PRCP including the plurality of content items;
  sending, by the reviewer device over the EET, one or more edits to the PRCP or one or more edits to individual content items of the plurality of content items; and
  sending, by the reviewer device over the EET, an approval indicator to the representative device via the cloud computing system, wherein:
  the approval indicator indicates that reviewer-selected content items of the plurality of content items are approved for distribution to one or more recipient devices different than the reviewer device and the representative device,
  the approval indicator is to cause the cloud computing system to generate an approved RCP (ARCP) entity including the reviewer-selected content items by converting version of the content items from the PRCP indicated by the approval indicator into the ARCP, wherein the ARCP excludes unapproved content items from the PRCP,
  respective permissions associated with individual recipient devices of the one or more recipient devices indicate whether the individual recipient devices are permitted to access specified topics or content types of the individual content items in the ARCP, and
  the individual recipient devices are prevented from accessing approved content items of the ARCP that have topics or content types that are not indicated by the respective permissions.

18. The method of claim 17, further comprising:
  generating, by the reviewer device, a graphical user interface (GUI) including a first graphical control element (GCE) and a second GCE;
  obtaining the one or more edits in response to selection of the first GCE; and
  sending, by the reviewer device over the EET, the approval indicator to the cloud computing system in response to selection of the second GCE.

19. The method of claim 17, wherein at least one content item of the plurality of content items has a different format than other content items of the plurality of content items.

* * * * *